US010614857B2

(12) United States Patent
Wasada et al.

(10) Patent No.: US 10,614,857 B2
(45) Date of Patent: Apr. 7, 2020

(54) CALIBRATING MEDIA PLAYBACK CHANNELS FOR SYNCHRONIZED PRESENTATION

(71) Applicant: Apple Inc., Cupertino, CA (US)

(72) Inventors: Langford M Wasada, San Francisco, CA (US); Vijay Sundaram, San Ramon, CA (US); William M Bumgarner, San Jose, CA (US); Daniel H Lloyd, San Jose, CA (US); Christopher J Sanders, San Jose, CA (US); Sean A Ramprashad, Los Altos, CA (US); Sriram Hariharan, San Jose, CA (US); Jarrad A Stallone, Fremont, CA (US); Johannes P Schmidt, Los Altos Hills, CA (US); David P Saracino, Alameda, CA (US); Gregory R Chapman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 92 days.

(21) Appl. No.: 16/025,592

(22) Filed: Jul. 2, 2018

(65) Prior Publication Data

US 2020/0005830 A1    Jan. 2, 2020

(51) Int. Cl.
*G11B 27/11* (2006.01)
*H04B 17/21* (2015.01)
(Continued)

(52) U.S. Cl.
CPC ............. *G11B 27/11* (2013.01); *H04B 17/21* (2015.01); *H04B 17/364* (2015.01); *H04N 5/04* (2013.01);
(Continued)

(58) Field of Classification Search
CPC ........ G11B 27/11; H04N 5/04; H04N 5/4403; H04B 17/21; H04B 17/364
See application file for complete search history.

(56) References Cited

U.S. PATENT DOCUMENTS

| 4,807,224 A | 2/1989 | Naron et al. |
| 5,534,911 A | 7/1996 | Levitan |

(Continued)

FOREIGN PATENT DOCUMENTS

| EP | 0146334 A2 | 6/1985 |
| EP | 0830026 A2 | 3/1998 |

(Continued)

OTHER PUBLICATIONS

Maulik, "Synchronizing mp3 playback, version #2," obtained from http://snarfed.org/exec/version?name=synchronizing+mp3+playback &version=2, generated Jun. 8, 2006, version #2 dated Dec. 28, 2004 in history, 2-pgs.

(Continued)

*Primary Examiner* — Mishawn N. Hunter
(74) *Attorney, Agent, or Firm* — Invoke

(57) ABSTRACT

In some implementations, a computing device can calibrate media playback channels for presenting media content through a media system by determining the media propagation latency through the media system. For example, the computing device can send calibration content (e.g., audio data, video data, etc.) to various playback devices (e.g., playback channels) of the media system and record a timestamp indicating when the calibration content was sent. When the playback devices present the calibration content, a sensor device (e.g., remote control device, smartphone, etc.) can detect the presentation of the calibration content. The sensor device can send calibration data (e.g., media samples that may include the calibration content and/or a timestamp indicating when the media sample was detected (Continued)

by the sensor device) to the computing device. The computing device can determine the propagation latency (e.g., presentation delay) based on the calibration data received from the sensor device.

20 Claims, 8 Drawing Sheets

(51) Int. Cl.
  *H04N 5/44* (2011.01)
  *H04W 56/00* (2009.01)
  *H04N 5/04* (2006.01)
  *H04B 17/364* (2015.01)

(52) U.S. Cl.
  CPC ........ *H04N 5/4403* (2013.01); *H04W 56/009* (2013.01)

(56) References Cited

U.S. PATENT DOCUMENTS

| | | |
|---|---|---|
| 5,535,381 A | 7/1996 | Kopper |
| 5,553,222 A | 9/1996 | Milne et al. |
| 5,559,945 A | 9/1996 | Beaudet et al. |
| 5,583,993 A | 12/1996 | Foster et al. |
| 5,587,404 A | 12/1996 | Kroener et al. |
| 5,613,863 A | 3/1997 | Klaus et al. |
| 5,616,876 A | 4/1997 | Cluts |
| 5,640,566 A | 6/1997 | Victor et al. |
| 5,664,044 A | 9/1997 | Ware |
| 5,664,226 A | 9/1997 | Czako et al. |
| 5,666,530 A | 9/1997 | Clark et al. |
| 5,696,948 A | 12/1997 | Cruz et al. |
| 5,709,521 A | 1/1998 | Glass et al. |
| 5,710,922 A | 1/1998 | Alley et al. |
| 5,721,949 A | 2/1998 | Smith et al. |
| 5,722,041 A | 2/1998 | Freadman |
| 5,727,202 A | 3/1998 | Kucala |
| 5,739,451 A | 4/1998 | Winksy et al. |
| 5,745,583 A | 4/1998 | Koizumi et al. |
| 5,751,997 A | 5/1998 | Kullick et al. |
| 5,790,521 A | 8/1998 | Lee et al. |
| 5,815,297 A | 9/1998 | Ciciora |
| 5,835,721 A | 11/1998 | Donahue et al. |
| 5,835,732 A | 11/1998 | Kikinis et al. |
| 5,845,282 A | 12/1998 | Alley et al. |
| 5,864,868 A | 1/1999 | Contois |
| 5,867,668 A | 2/1999 | Spirakis et al. |
| 5,875,354 A | 2/1999 | Charlton et al. |
| 5,918,213 A | 6/1999 | Bernard et al. |
| 5,918,303 A | 6/1999 | Yamaura et al. |
| 5,923,757 A | 7/1999 | Hocker et al. |
| 5,925,843 A | 7/1999 | Miller et al. |
| 5,931,906 A | 8/1999 | Fidelibus et al. |
| 5,953,350 A | 9/1999 | Higgins |
| 5,963,916 A | 10/1999 | Kaplan |
| 5,969,283 A | 10/1999 | Looney et al. |
| 6,000,000 A | 12/1999 | Hawkins et al. |
| 6,006,274 A | 12/1999 | Hawkins et al. |
| 6,008,777 A | 12/1999 | Yiu |
| 6,038,199 A | 3/2000 | Pawlowski et al. |
| 6,041,023 A | 3/2000 | Lakhansingh |
| 6,061,306 A | 5/2000 | Buchheim |
| 6,085,252 A | 7/2000 | Zhu et al. |
| 6,092,119 A | 7/2000 | Rossmere et al. |
| 6,101,591 A | 8/2000 | Foster et al. |
| 6,125,369 A | 9/2000 | Wu et al. |
| 6,138,245 A | 10/2000 | Son et al. |
| 6,166,314 A | 12/2000 | Weinstock et al. |
| 6,172,948 B1 | 1/2001 | Keller et al. |
| 6,208,044 B1 | 3/2001 | Viswanadham et al. |
| 6,212,359 B1 | 4/2001 | Knox |
| 6,216,131 B1 | 4/2001 | Liu et al. |
| 6,243,328 B1 | 6/2001 | Fenner et al. |
| 6,243,725 B1 | 6/2001 | Hempleman et al. |
| 6,243,772 B1 | 6/2001 | Ghori et al. |
| 6,247,135 B1 | 6/2001 | Feague |
| 6,248,946 B1 | 6/2001 | Dwek |
| 6,263,313 B1 | 7/2001 | Milsted et al. |
| 6,263,503 B1 | 7/2001 | Margulis |
| 6,272,545 B1 | 8/2001 | Flanagin et al. |
| 6,282,714 B1 | 8/2001 | Ghori et al. |
| 6,283,764 B2 | 9/2001 | Kajiyama et al. |
| 6,295,541 B1 | 9/2001 | Bodnar et al. |
| 6,332,175 B1 | 12/2001 | Birrell et al. |
| 6,338,044 B1 | 1/2002 | Cook et al. |
| 6,341,316 B1 | 1/2002 | Kloba et al. |
| 6,345,256 B1 | 2/2002 | Milsted et al. |
| 6,356,971 B1 | 3/2002 | Katz et al. |
| 6,374,177 B1 | 4/2002 | Lee et al. |
| 6,380,947 B1 | 4/2002 | Stead |
| 6,389,467 B1 | 5/2002 | Eyal |
| 6,397,388 B1 | 5/2002 | Allen |
| 6,411,943 B1 | 6/2002 | Crawford |
| 6,429,880 B2 | 8/2002 | Marcos et al. |
| 6,453,281 B1 | 9/2002 | Walters et al. |
| 6,489,986 B1 | 12/2002 | Allen |
| 6,490,432 B1 | 12/2002 | Wegener et al. |
| 6,493,758 B1 | 12/2002 | McLain |
| 6,523,124 B1 | 2/2003 | Lunsford et al. |
| 6,529,233 B1 | 3/2003 | Allen |
| 6,529,804 B1 | 3/2003 | Draggon et al. |
| 6,563,769 B1 | 5/2003 | Van Der Meulen |
| 6,587,403 B1 | 7/2003 | Keller et al. |
| 6,587,404 B1 | 7/2003 | Keller et al. |
| 6,587,480 B1 | 7/2003 | Sanders |
| 6,621,768 B1 | 9/2003 | Keller et al. |
| 6,630,963 B1 | 10/2003 | Billmaier |
| 6,636,873 B1 | 10/2003 | Carini et al. |
| 6,659,861 B1 | 12/2003 | Faris et al. |
| 6,664,981 B2 | 12/2003 | Ashe et al. |
| 6,665,803 B2 | 12/2003 | Lunsford et al. |
| 6,684,060 B1 | 1/2004 | Curtin |
| 6,694,200 B1 | 2/2004 | Naim |
| 6,718,348 B1 | 4/2004 | Novak et al. |
| 6,721,489 B1 | 4/2004 | Benyamin et al. |
| 6,728,585 B2 | 4/2004 | Neoh |
| 6,728,729 B1 | 4/2004 | Jawa et al. |
| 6,731,312 B2 | 5/2004 | Robbin |
| 6,744,738 B1 | 6/2004 | Park et al. |
| 6,757,913 B2 | 6/2004 | Knox |
| 6,760,721 B1 | 7/2004 | Chasen et al. |
| 6,763,345 B1 | 7/2004 | Hempleman et al. |
| 6,766,376 B2 | 7/2004 | Price |
| 6,779,019 B1 | 8/2004 | Mousseau et al. |
| 6,785,542 B1 | 8/2004 | Blight et al. |
| 6,794,566 B2 | 9/2004 | Pachet |
| 6,798,838 B1 | 9/2004 | Ngo |
| 6,801,964 B1 | 10/2004 | Mahdavi |
| 6,831,881 B2 | 12/2004 | Patil et al. |
| 6,845,398 B1 | 1/2005 | Galensky et al. |
| 6,874,037 B1 | 3/2005 | Abram et al. |
| 6,920,179 B1 | 7/2005 | Anand et al. |
| 6,925,595 B1 | 8/2005 | Whitledge et al. |
| 6,928,433 B2 | 8/2005 | Goodman et al. |
| 6,929,058 B2 | 8/2005 | Liu et al. |
| 6,941,324 B2 | 9/2005 | Plastina et al. |
| 6,944,880 B1 | 9/2005 | Allen |
| 6,956,562 B1 | 10/2005 | O'Hara et al. |
| 6,959,288 B1 | 10/2005 | Medina et al. |
| 6,959,562 B2 | 11/2005 | Navedo et al. |
| 6,978,127 B1 | 12/2005 | Bulthuis et al. |
| 6,981,259 B2 | 12/2005 | Luman et al. |
| 6,985,966 B1 | 1/2006 | Gupta et al. |
| 6,993,532 B1 | 1/2006 | Platt et al. |
| 6,993,722 B1 | 1/2006 | Greer et al. |
| 6,999,826 B1 | 2/2006 | Zhou et al. |
| 7,010,758 B2 | 3/2006 | Bate |
| 7,016,443 B1 | 3/2006 | Splett |
| 7,022,905 B1 | 4/2006 | Hinman et al. |
| 7,024,214 B2 | 4/2006 | Loveland |
| 7,024,491 B1 | 4/2006 | Hanmann et al. |
| 7,024,575 B2 | 4/2006 | Lienhart et al. |

(56) References Cited

U.S. PATENT DOCUMENTS

| | | |
|---|---|---|
| 7,034,891 B2 | 4/2006 | Joung et al. |
| 7,039,656 B1 | 5/2006 | Tsai et al. |
| 7,047,308 B2 | 5/2006 | Deshpande |
| 7,069,058 B2 | 6/2006 | Kawashima |
| 7,075,000 B2 | 7/2006 | Gang et al. |
| 7,076,204 B2 | 7/2006 | Richenstein et al. |
| 7,082,310 B2 | 7/2006 | Hirayama et al. |
| 7,082,320 B2 | 7/2006 | Kattukaran et al. |
| 7,084,898 B1 | 8/2006 | Firestone et al. |
| 7,096,271 B1 | 8/2006 | Omoigui et al. |
| 7,111,009 B1 | 9/2006 | Gupta et al. |
| 7,130,892 B2 | 10/2006 | Mukai |
| 7,136,934 B2 | 11/2006 | Carter et al. |
| 7,142,934 B2 | 11/2006 | Janik |
| 7,146,322 B2 | 12/2006 | Cowgill |
| 7,174,560 B1 | 2/2007 | Crinon |
| 7,184,774 B2 | 2/2007 | Robinson et al. |
| 7,185,084 B2 | 2/2007 | Sirivara et al. |
| 7,194,692 B2 | 3/2007 | Marcos et al. |
| 7,260,714 B2 | 8/2007 | Dawson et al. |
| 7,266,713 B2 | 9/2007 | Lienhart et al. |
| 7,281,141 B2 | 10/2007 | Elkayam et al. |
| 7,283,880 B2 | 10/2007 | Dick |
| 7,289,393 B2 | 10/2007 | Keller et al. |
| 7,295,809 B2 | 11/2007 | Moore |
| 7,295,983 B2 | 11/2007 | Fujiwara et al. |
| 7,302,239 B2 | 11/2007 | Jitsuhara |
| 7,305,691 B2 | 12/2007 | Cristofalo |
| 7,343,553 B1 | 3/2008 | Kaye |
| 7,346,698 B2 | 3/2008 | Hannaway |
| 7,359,671 B2 | 4/2008 | Richenstein et al. |
| 7,367,701 B2 | 5/2008 | Lee |
| 7,369,532 B2 | 5/2008 | Silvester |
| 7,370,129 B2 | 5/2008 | Green et al. |
| 7,406,294 B1 | 7/2008 | Liu |
| 7,430,753 B2 | 9/2008 | Gray et al. |
| 7,437,158 B2 | 10/2008 | Russell |
| 7,444,388 B1 | 10/2008 | Svendsen |
| 7,469,283 B2 | 12/2008 | Eyal et al. |
| 7,471,988 B2 | 12/2008 | Smith et al. |
| 7,474,677 B2 | 1/2009 | Trott |
| 7,480,746 B2 | 1/2009 | Simon et al. |
| 7,483,538 B2 | 1/2009 | McCarty et al. |
| 7,502,604 B2 | 3/2009 | Knox |
| 7,508,815 B2 | 3/2009 | Lapeyre et al. |
| 7,519,681 B2 | 4/2009 | Edwards et al. |
| 7,519,686 B2 | 4/2009 | Hong et al. |
| 7,539,777 B1 | 5/2009 | Aitken |
| 7,542,784 B2 | 6/2009 | Passier et al. |
| 7,555,291 B2 | 6/2009 | Waessingbo |
| 7,561,215 B2 | 7/2009 | Kim et al. |
| 7,577,261 B2 | 8/2009 | Liu et al. |
| 7,606,570 B2 | 10/2009 | Karaoguz et al. |
| 7,617,513 B2 | 11/2009 | McCafferty et al. |
| 7,620,011 B2 | 11/2009 | Kim et al. |
| 7,627,343 B2 | 12/2009 | Fadell et al. |
| 7,634,227 B2 | 12/2009 | De Jong |
| 7,698,297 B2 | 4/2010 | Jawa et al. |
| 7,724,780 B2 | 5/2010 | Baird et al. |
| 7,769,903 B2 | 8/2010 | Robbin et al. |
| 7,797,446 B2 | 9/2010 | Heller et al. |
| 7,821,574 B2 | 10/2010 | Black |
| 7,996,505 B2 | 8/2011 | Krantz et al. |
| 8,037,220 B2 | 10/2011 | Moore et al. |
| 8,184,657 B2 | 5/2012 | Dacosta |
| 8,185,674 B2 | 5/2012 | Moore et al. |
| 8,214,447 B2 | 7/2012 | Deslippe et al. |
| 8,284,739 B2 | 10/2012 | Doyle et al. |
| 8,301,790 B2 * | 10/2012 | Morrison ............ G10H 1/0058 709/203 |
| 8,374,087 B2 | 2/2013 | Dacosta |
| 8,689,036 B2 | 4/2014 | Millington et al. |
| 8,918,541 B2 * | 12/2014 | Morrison ............ G06F 16/4393 709/248 |
| 8,957,972 B2 * | 2/2015 | Gluskin ................ H04N 17/00 348/192 |
| 9,182,777 B2 | 11/2015 | Millington |
| 9,189,011 B2 | 11/2015 | Millington |
| 9,207,905 B2 | 12/2015 | Millington |
| 9,417,689 B1 * | 8/2016 | Ramaswamy ............ G06F 3/01 |
| 9,763,018 B1 | 9/2017 | McPherson et al. |
| 9,826,012 B2 | 11/2017 | Hao et al. |
| 2001/0004310 A1 | 6/2001 | Kono |
| 2001/0008535 A1 | 7/2001 | Lanigan |
| 2001/0011308 A1 | 8/2001 | Clark et al. |
| 2001/0018858 A1 | 9/2001 | Dwek |
| 2001/0021053 A1 | 9/2001 | Colbourne et al. |
| 2001/0021305 A1 | 9/2001 | Sugiyama et al. |
| 2001/0021998 A1 | 9/2001 | Margulis |
| 2001/0041021 A1 | 11/2001 | Boyle et al. |
| 2001/0044835 A1 | 11/2001 | Schober et al. |
| 2001/0048642 A1 | 12/2001 | Berhan |
| 2001/0052123 A1 | 12/2001 | Kawai |
| 2002/0002413 A1 | 1/2002 | Tokue |
| 2002/0013784 A1 | 1/2002 | Swanson |
| 2002/0013852 A1 | 1/2002 | Janik |
| 2002/0013853 A1 | 1/2002 | Baber et al. |
| 2002/0019984 A1 | 2/2002 | Rakib |
| 2002/0045960 A1 | 4/2002 | Phillips et al. |
| 2002/0046315 A1 | 4/2002 | Miller et al. |
| 2002/0055934 A1 | 5/2002 | Lipscomb et al. |
| 2002/0073139 A1 | 6/2002 | Hawkins et al. |
| 2002/0074413 A1 | 6/2002 | Henzerling |
| 2002/0078075 A1 | 6/2002 | Colson et al. |
| 2002/0081098 A1 | 6/2002 | Scally |
| 2002/0095663 A1 | 7/2002 | Joory |
| 2002/0103554 A1 | 8/2002 | Coles et al. |
| 2002/0113824 A1 | 8/2002 | Myers |
| 2002/0116082 A1 | 8/2002 | Gudorf |
| 2002/0118848 A1 | 8/2002 | Karpenstein |
| 2002/0133515 A1 | 9/2002 | Kagle et al. |
| 2002/0133824 A1 | 9/2002 | Mensch |
| 2002/0138606 A1 | 9/2002 | Robison |
| 2002/0156921 A1 | 10/2002 | Dutta et al. |
| 2002/0161865 A1 | 10/2002 | Nguyen |
| 2002/0164973 A1 | 11/2002 | Janik et al. |
| 2002/0174243 A1 | 11/2002 | Spurgat et al. |
| 2002/0174269 A1 | 11/2002 | Spurgat et al. |
| 2002/0194309 A1 | 12/2002 | Carter et al. |
| 2002/0196912 A1 | 12/2002 | Norris |
| 2003/0013332 A1 | 1/2003 | Lin |
| 2003/0013492 A1 | 1/2003 | Bokhari et al. |
| 2003/0013493 A1 | 1/2003 | Irimajiri et al. |
| 2003/0030733 A1 | 2/2003 | Seaman et al. |
| 2003/0037254 A1 | 2/2003 | Fischer et al. |
| 2003/0045955 A1 | 3/2003 | Janik |
| 2003/0046434 A1 | 3/2003 | Flanagin et al. |
| 2003/0050058 A1 | 3/2003 | Walsh et al. |
| 2003/0065802 A1 | 4/2003 | Vitikainen et al. |
| 2003/0074457 A1 | 4/2003 | Kluth |
| 2003/0076301 A1 | 4/2003 | Tsuk et al. |
| 2003/0079038 A1 | 4/2003 | Robbin et al. |
| 2003/0083954 A1 | 5/2003 | Namba |
| 2003/0097379 A1 | 5/2003 | Ireton |
| 2003/0112279 A1 | 6/2003 | Irimajiri |
| 2003/0120742 A1 | 6/2003 | Ohgami et al. |
| 2003/0131360 A1 | 7/2003 | Joung et al. |
| 2003/0134589 A1 | 7/2003 | Oba |
| 2003/0158737 A1 | 8/2003 | Csicsatka |
| 2003/0167318 A1 | 9/2003 | Robbin et al. |
| 2003/0181203 A1 | 9/2003 | Cheshire |
| 2003/0182315 A1 | 9/2003 | Plastina et al. |
| 2003/0191756 A1 | 10/2003 | Oh |
| 2003/0197725 A1 | 10/2003 | Tuli |
| 2003/0210821 A1 | 11/2003 | Yogeshwar et al. |
| 2003/0221161 A1 | 11/2003 | Balassanian et al. |
| 2003/0221541 A1 | 12/2003 | Platt |
| 2003/0229900 A1 | 12/2003 | Reisman |
| 2004/0001395 A1 | 1/2004 | Keller et al. |
| 2004/0001396 A1 | 1/2004 | Keller et al. |
| 2004/0001494 A1 | 1/2004 | Barrack et al. |
| 2004/0003151 A1 | 1/2004 | Bateman et al. |
| 2004/0004338 A1 | 1/2004 | Jung |

(56) References Cited

U.S. PATENT DOCUMENTS

| | | |
|---|---|---|
| 2004/0017997 A1 | 1/2004 | Cowgill |
| 2004/0027930 A1 | 2/2004 | Kudo |
| 2004/0031058 A1 | 2/2004 | Reisman |
| 2004/0045030 A1 | 3/2004 | Reynolds et al. |
| 2004/0055446 A1 | 3/2004 | Robbin et al. |
| 2004/0057446 A1 | 3/2004 | Varsa et al. |
| 2004/0068536 A1 | 4/2004 | Demers et al. |
| 2004/0072584 A1 | 4/2004 | Kern |
| 2004/0076086 A1 | 4/2004 | Keller et al. |
| 2004/0078416 A1 | 4/2004 | Kawasaki et al. |
| 2004/0128198 A1 | 7/2004 | Register et al. |
| 2004/0128402 A1 | 7/2004 | Weaver et al. |
| 2004/0132510 A1 | 7/2004 | Yamashita |
| 2004/0133908 A1 | 7/2004 | Smith et al. |
| 2004/0139180 A1 | 7/2004 | White et al. |
| 2004/0139233 A1 | 7/2004 | Kellerman et al. |
| 2004/0139844 A1 | 7/2004 | Tsuboi |
| 2004/0143442 A1 | 7/2004 | Knight |
| 2004/0157548 A1 | 8/2004 | Eyer |
| 2004/0174896 A1 | 9/2004 | Caspi et al. |
| 2004/0177063 A1 | 9/2004 | Weber et al. |
| 2004/0177371 A1 | 9/2004 | Caspi et al. |
| 2004/0177377 A1 | 9/2004 | Lin et al. |
| 2004/0179540 A1 | 9/2004 | Lee et al. |
| 2004/0193900 A1 | 9/2004 | Nair |
| 2004/0215810 A1 | 10/2004 | Tan et al. |
| 2004/0216108 A1 | 10/2004 | Robbin |
| 2004/0221088 A1 | 11/2004 | Lisitsa et al. |
| 2004/0223622 A1 | 11/2004 | Lindemann et al. |
| 2004/0225762 A1 | 11/2004 | Poo |
| 2004/0234088 A1 | 11/2004 | McCarty et al. |
| 2004/0236568 A1 | 11/2004 | Guillen et al. |
| 2004/0242224 A1 | 12/2004 | Janik et al. |
| 2004/0250273 A1 | 12/2004 | Swix et al. |
| 2004/0252604 A1 | 12/2004 | Johnson et al. |
| 2004/0255326 A1 | 12/2004 | Hicks et al. |
| 2004/0261040 A1 | 12/2004 | Radcliffe et al. |
| 2004/0261112 A1 | 12/2004 | Hicks et al. |
| 2004/0267825 A1 | 12/2004 | Novak et al. |
| 2005/0010616 A1 | 1/2005 | Burks |
| 2005/0055444 A1 | 3/2005 | Venkatasubramanian |
| 2005/0071375 A1 | 3/2005 | Houghton et al. |
| 2005/0080915 A1 | 4/2005 | Shoemaker et al. |
| 2005/0089052 A1 | 4/2005 | Chen et al. |
| 2005/0147130 A1 | 7/2005 | Hurwitz et al. |
| 2005/0174488 A1 | 8/2005 | Chennakeshu |
| 2005/0201360 A1 | 9/2005 | Redstone |
| 2005/0201398 A1 | 9/2005 | Naik et al. |
| 2005/0207726 A1 | 9/2005 | Chen |
| 2005/0226233 A1 | 10/2005 | Kryuchkov et al. |
| 2005/0235015 A1 | 10/2005 | Abanami et al. |
| 2005/0235048 A1 | 10/2005 | Costa-Requena et al. |
| 2005/0240494 A1 | 10/2005 | Cue et al. |
| 2005/0240661 A1 | 10/2005 | Heller et al. |
| 2005/0240745 A1 | 10/2005 | Iyer et al. |
| 2005/0254447 A1 | 11/2005 | Miller-Smith |
| 2005/0262528 A1 | 11/2005 | Herley et al. |
| 2005/0265316 A1 | 12/2005 | Liu et al. |
| 2005/0273790 A1 | 12/2005 | Kearney et al. |
| 2006/0007943 A1 | 1/2006 | Fellman |
| 2006/0015580 A1 | 1/2006 | Gabriel et al. |
| 2006/0027080 A1 | 2/2006 | Schultz |
| 2006/0030961 A1 | 2/2006 | Lin |
| 2006/0062242 A1 | 3/2006 | Dacosta |
| 2006/0062243 A1 | 3/2006 | Dacosta |
| 2006/0067463 A1 | 3/2006 | Hack et al. |
| 2006/0069724 A1 | 3/2006 | Langdon |
| 2006/0074637 A1 | 4/2006 | Berreth |
| 2006/0083194 A1 | 4/2006 | Dhrimaj et al. |
| 2006/0090202 A1 | 4/2006 | Liu et al. |
| 2006/0092844 A1 | 5/2006 | Jeon et al. |
| 2006/0100978 A1 | 5/2006 | Heller et al. |
| 2006/0106806 A1 | 5/2006 | Sperling et al. |
| 2006/0117371 A1 | 6/2006 | Margulis |
| 2006/0126667 A1 | 6/2006 | Smith et al. |
| 2006/0143455 A1 | 6/2006 | Gitzinger |
| 2006/0159109 A1 | 7/2006 | Lamkin et al. |
| 2006/0167982 A1 | 7/2006 | Jawa et al. |
| 2006/0168351 A1 | 7/2006 | Ng et al. |
| 2006/0224620 A1 | 10/2006 | Silverman et al. |
| 2006/0245451 A1 | 11/2006 | Wakid |
| 2006/0253279 A1 | 11/2006 | Sung |
| 2006/0274747 A1 | 12/2006 | Duchscher et al. |
| 2006/0277216 A1 | 12/2006 | Shukhman |
| 2006/0288057 A1 | 12/2006 | Collins et al. |
| 2007/0033052 A1 | 2/2007 | Cowgill |
| 2007/0038941 A1 | 2/2007 | Wysocki et al. |
| 2007/0067309 A1 | 3/2007 | Klein et al. |
| 2007/0073723 A1 | 3/2007 | Ramer et al. |
| 2007/0073728 A1 | 3/2007 | Klein et al. |
| 2007/0074118 A1 | 3/2007 | Robbin et al. |
| 2007/0084333 A1 | 4/2007 | Robbin et al. |
| 2007/0088727 A1 | 4/2007 | Kindig |
| 2007/0088764 A1 | 4/2007 | Yoon et al. |
| 2007/0110074 A1 | 5/2007 | Bradley et al. |
| 2007/0124680 A1 | 5/2007 | Robbin et al. |
| 2007/0130541 A1 | 6/2007 | Louch et al. |
| 2007/0169115 A1 | 7/2007 | Ko et al. |
| 2007/0185919 A1 | 8/2007 | Kaplan et al. |
| 2007/0203954 A1 | 8/2007 | Vargas et al. |
| 2007/0220552 A1 | 9/2007 | Juster et al. |
| 2007/0250761 A1 | 10/2007 | Bradley et al. |
| 2007/0271312 A1 | 11/2007 | Heller et al. |
| 2007/0291323 A1 | 12/2007 | Roncal |
| 2008/0018927 A1 | 1/2008 | Martin et al. |
| 2008/0028008 A1 | 1/2008 | Brunet et al. |
| 2008/0065247 A1 | 3/2008 | Igoe |
| 2008/0086494 A1 | 4/2008 | Heller et al. |
| 2008/0164581 A1 | 7/2008 | Cho et al. |
| 2008/0168185 A1 | 7/2008 | Robbin et al. |
| 2008/0168245 A1 | 7/2008 | De et al. |
| 2008/0168391 A1 | 7/2008 | Robbin et al. |
| 2008/0168525 A1 | 7/2008 | Heller et al. |
| 2008/0168526 A1 | 7/2008 | Robbin et al. |
| 2008/0229335 A1 | 9/2008 | Robbin et al. |
| 2009/0172200 A1* | 7/2009 | Morrison ............ G10H 1/0058 709/248 |
| 2009/0290725 A1 | 11/2009 | Huang |
| 2011/0264732 A1 | 10/2011 | Robbin et al. |
| 2013/0058593 A1* | 3/2013 | Kanalakis, Jr. ........ H04N 7/007 382/286 |
| 2014/0006946 A1 | 1/2014 | Robbin et al. |
| 2014/0037097 A1 | 2/2014 | Labosco |
| 2014/0244863 A1 | 8/2014 | Bradley et al. |
| 2014/0307585 A1 | 10/2014 | Kearney et al. |
| 2017/0054774 A1 | 2/2017 | Robbin et al. |

FOREIGN PATENT DOCUMENTS

| | | |
|---|---|---|
| EP | 0917077 A2 | 5/1999 |
| EP | 0982732 A1 | 3/2000 |
| EP | 1028425 A2 | 8/2000 |
| EP | 1112931 A2 | 7/2001 |
| EP | 1122931 A2 | 8/2001 |
| EP | 1143719 A2 | 10/2001 |
| EP | 1353269 A2 | 10/2003 |
| EP | 1408427 A2 | 4/2004 |
| EP | 1429569 A1 | 6/2004 |
| EP | 1463334 A2 | 9/2004 |
| EP | 1523171 A1 | 4/2005 |
| EP | 1548740 A2 | 6/2005 |
| EP | 1751949 A1 | 2/2007 |
| EP | 2360887 A1 | 8/2011 |
| EP | 2375678 A1 | 10/2011 |
| JP | 2000-339917 A | 12/2000 |
| JP | 2001-093226 A | 4/2001 |
| JP | 2001-117800 A | 4/2001 |
| JP | 2003-077214 A | 3/2003 |
| JP | 2003-303137 A | 10/2003 |
| JP | 2003-319485 A | 11/2003 |
| KR | 10-2001-0063284 A | 7/2001 |
| KR | 10-2001-0079176 A | 8/2001 |
| KR | 10-2002-0001127 A | 1/2002 |
| KR | 10-2002-0011027 A | 2/2002 |

(56) References Cited

FOREIGN PATENT DOCUMENTS

| | | |
|---|---|---|
| KR | 10-2006-0035634 A | 4/2006 |
| KR | 10-0599204 B1 | 7/2006 |
| WO | 94/08337 A1 | 4/1994 |
| WO | 95/16950 A1 | 6/1995 |
| WO | 00/16533 A1 | 3/2000 |
| WO | 00/43914 A1 | 7/2000 |
| WO | 01/26374 A1 | 4/2001 |
| WO | 01/33569 A1 | 5/2001 |
| WO | 01/67753 A1 | 9/2001 |
| WO | 02/25610 A1 | 3/2002 |
| WO | 02/25935 A2 | 3/2002 |
| WO | 02/65723 A1 | 8/2002 |
| WO | 02/65732 A1 | 8/2002 |
| WO | 2003/009601 A1 | 1/2003 |
| WO | 2003/023786 A2 | 3/2003 |
| WO | 03/38637 A1 | 5/2003 |
| WO | 2003/036541 A1 | 5/2003 |
| WO | 2004/004338 A1 | 1/2004 |
| WO | 2004/034286 A1 | 4/2004 |
| WO | 2004/057474 A1 | 7/2004 |
| WO | 2004/084413 A2 | 9/2004 |
| WO | 2005/060387 A2 | 7/2005 |
| WO | 2005/114472 A1 | 12/2005 |
| WO | 2005/122531 A1 | 12/2005 |
| WO | 2006/007322 A2 | 1/2006 |
| WO | 2006/047578 A2 | 5/2006 |
| WO | 2007/079360 A1 | 7/2007 |
| WO | 2007/079334 A3 | 8/2007 |
| WO | 2008/033771 A2 | 3/2008 |

OTHER PUBLICATIONS

Maulik, "Synchronizing mp3 playback, version #1," obtained from http://snarfed.org/exec/version?name=synchronizing+mp3+playback&version=1-, generated Jun. 8, 2006, version #1 dated Nov. 8, 2004 in history, 2-pgs.
Maulik and Ryan, "Synchronizing mp3 playback, version #9," obtained from http://snarfed.org/exec/version?name=synchronizing+mp3+playback&version=9-, generated Jun. 8, 2006, version #9 dated Mar. 3, 2005 in history, 3-pgs.
Wikipedia: "iTunes", www.wikipedia.com, May 9, 2005, 6 pages. (U.S. Appl. No. 11/519,429).
Wikipedia, "IEEE 1394," 13 pgs (Firewire and also known as Sony's iLink) (downloaded from https://en.wikipedia.org/wiki/IEEE.sub.-1394).
Travis Butler, "Portable MP3: the Nomad Jukebox," Aug. 1, 2001, available from http://db.tidbits.com/getbits.acgi?tbart=06261. downloaded Jul. 13, 2011 at http://www.tidbits.com/article/6261 (U.S. Appl. No. 11/519,429).
Travis Butler, "Archos Jukebox 6000 Challenges Nomad Jukebox," Aug. 13, 2001, available from http://db.tidbits.com/getbits.acgi?tbart=06521—Downloaded Jul. 13, 2011 @ http://www.tidbits.com/article/6521?print version=1 (U.S. Appl. No. 11/519,429).
Titmus. Richard. "Softsqueeze 2.0." obtained from http://softsqueeze.souceforge.net/. generated Jun. 8, 2006. copyright 2004. 2005. 3-pgs.
Stewart et al., "Request for Comments: 3758," Network Working Group, May 2004, 22-pgs.
snarfed.org,"libmsntp," obtained from http://snarfed.org/spact/libmsntp, generated Jun. 8, 2006, undated, 2 pgs.
Snarfed.org, "History of Synchronizing mp3 playback," obtained from http://snarfed.org/exec/history?name=synchronizing+mp3+playback, generated Jun. 8, 2006, 2-pgs.
Slim Devices, Inc., "Squeezebox 2: Owner's Guide," copyright 2005, 28-pgs.
Slim Devices, Inc., "Slim Devices: Squeezebox: Free Your Music," obtained from http://www.slimdevices.com/index.html, generated Jun. 8, 2006, copyright 2002-2004, 1-pg.
Slim Devices, Inc. "Slim Devices: Support: FAQ," obtained from http://www.slimdevices.com/su.sub.—faq.html, generated Jun. 21, 2006, copyright 2002-2005, 31 pgs.
Slim Devices, Inc. "Slim Devices: Squeezebox: Overview" obtained from http:www.slimdevices.com/pi.sub.--overview.html, generated Jun. 21, 2006, copyright 2002-0226, 3 pgs.
Shulzrinne et al., "Request for Comments: 3550," Network Working Group, Jul. 2003, 104-pgs.
Schulzrinne Comumbia U A RAO Netscape R Lanphier RealNetworks H: "Real Time Streaming Protocol (RTSP)" IETF Standard, Internet Engineering Task Force, IETF, CH, Apr.
Perkins C. "RTP Audio and Video for the Internet" 2003, Addison-Wesley, pp. 107-109.
Palacharla, et al. "Design and Implementation of a Real-time Multimedia Presentation System using RTP;"Computer Software and Applications Conference; Aug. 13, 1997; pp. 376-381.
Nullsoft, "winamp.com / Plug-ins," obtained from http://winamp.com/plugins/details.php?id=15667, generated Jun. 8, 2006, copyright 2006, 2 pgs.
Nomad Jukebox, User Guide, Creative Technology Ltd., Version 1, Aug. 2000. [38 pages downloaded Aug. 16, 2011] (U.S. Appl. No. 11/519,429).
Nilsson, "IDS tag versions 2.4.0.—Main Structure," Nov. 1, 2000 (downloaded from http://www.id3.org/id3v2.4.0-structure?-action=print).
Myradus, LLC, "Myradus Media Player Puppeteer for iTunes," obtained from http://www.myradus.com/Product_MediaPlayerPuppeteerForm.aspx, generated Jun. 8, 2006, copyright 2004-2005, 1-pg.
Mills, David L., "Request for Comments: 1305," Network Working Group, Mar. 1992, 113-pgs.
Microsoft Corp., "Window's Media Player 6.4," 2 pgs, 1999 (software downloadable at http://www.oldversion.com/program php?n=wmp, downloaded Jul. 13, 2011 from http://www.microsoft.com/download/en/confirmation.axps?displaylangen&id=2- 2758).
Maulik and Ryan, "Synchronizing mp3 playback, version #8," http://snarfed.org/exec/version?name=synchronizing+mp3+playback&version=8, generated Jun. 8, 2006, version #8 dated Feb. 23, 2005 in history, 3 pgs.
Maulik and Ryan, "Synchronizing mp3 playback, version #6," obtained from http://snarfed.org/exec/version?name=synchronizing+mp3+playback&version=6, generated Jun. 8, 2006, version #6 dated Feb. 2, 2005 in history, 3-pgs.
Maulik and Ryan, "Synchronizing mp3 playback, version #5," obtained from http://snarfed.org/exec/version?name=synchronizing+mp3+playback&version=5, generated Jun. 8, 2006, version #5 dated Jan. 19, 2005 in history, 3-pgs.
Maulik and Ryan, "Synchronizing mp3 playback, version #4," obtained from http://snarfed.org/exec/version?name=synchronizing+mp3+playback&version=4-, generated Jun. 8, 2006, version #4 dated Jan. 3, 2005 in history, 3-pgs.
Maulik and Ryan, "Synchronizing mp3 playback, version #3," obtained from http://snarfed.org/exec/version?name=synchronizing+mp3+playback&version=3-, generated Jun. 8, 2006, version #3 dated Jan. 2, 2005 in history, 3-pgs.
Maulik and Ryan "Synchronizing mp3 playback, version#7," obtainedfromhftp://snarfed.org/exec/Nersion?name-synchronizing+rp3hpiaybackuerllon7generated6/8/2006version#?dated2/21/2005nhistoy3pgs.
M. Nilsson; ID3tag version 2.3.0; Feb. 3, 1999, http://www.id3lib.or/idev2.3.0.html [30 pages Jun. 29, 2011 at http://www/id3.org/id3v2.3.0?action=print] (U.S. Appl. No. 11/519,429).
Linksys "New Linksys Wireless Home Products Showcased at CEBIT 2004" Internet Article (Mar. 18, 2004) www.broadbandbuyerco.uk/Shop/pageTextDetail.asp?Setl0=28,TextI0=473.
K*Software, "Kquery.com," http://www.kquery.com/index.php?page=software_1%id=8, generated Jun. 8, 2006, copyright 2004, 4 pgs.
ITunes-perl, copyright 2004-2006 by Jay McGavren, obtained from the Internet at http://code.googlecom, pp. 7. (downloaded 5 pages on Jan. 13, 2012 from http://code.google.com/p/itunes-perl/wiki/Usage) (U.S. Appl. No. 11/519,429).
Iriver, "PMP140/120," 2 pgs, Sep. 13, 2004.
Handbook for Palm.TM. m500 Series Handhelds,User Manual.—(286 pages) (U.S. Appl. No. 11/519,429).

(56) References Cited

OTHER PUBLICATIONS

De Herrera, Chris, "Microsoft ActiveSync 11" Version 1.02, (Oct. 13, 2000 Downloaded Aug. 16, 2011 From http://www.pocketpcfaq.com/wce/activesync3.1.htm (U.S. Appl. No. 11/519,429).

Compaq Computer Corp., "Systems Research Center and PAAD," Personal Jukebox (PJB), 25 pgs, Oct. 13, 2000 (downloaded from http://research.compaq.com/SRC/pjb/; redownloaded Apr. 2016 from http://birrell.org/andrew/talks/pjb-overview.pdf).

Clifton, "Pipe.c, a Kla2 Module," 8 pgs, 2003 (retrieved Oct. 17, 2011 from http://www.codelode.com/Kernel/k1a2pepec.html, downloaded Apr. 18, 2012 from http://web.archive.org/2004010719482/http://www.codelode.com/Ke-rnel/kla2pipec . . . ).

Butler, "Archos Jukebox 6000 Challenges Nomad Jukebox," 6 pgs, Aug. 13, 2001 (from http://db.tidbits.com/getbits.acgi?tbart=06521 (downloaded Jul. 13, 2011 from http://www.tidbits.com/article/6521?printversion=1).

Apple, "Mac OS X: Bonjour," Technology Brief, Apr. 2005, 6-pgs.

Apple, "AirPort Express," Technology Overview, Jul. 2004, 31-pgs.

Apple Introduces iTunes—World's Best and Easiest to Use Jukebox Software, Macworld Expo, San Francisco, Jan. 9, 2011 [.about.2 pages Downloaded on Jul. 14, 2011 at http://www.apple.com/pr/library/2001/01/09Apple-Introduces-iTunes-Worlds— Best and Ea . . . ] (U.S. Appl. No. 11/519,429).

Apple Inc., "Apple-Downloads-Dashboard," 1 pg (downloaded Apr. 2016 from http://www.apple.com/downloads/dashboard).

Apple Announces iTunes 2, Press Release, Apple Computer, Inc., dated Oct. 23, 2001 http://www.apple.com/pr/library/2001/10/23Apple-Announces-iTunes-2.html] downloaded Apr. 8, 2012 (U.S. Appl. No. 11/519,429).

Adam C. Engst. "SoundJam Keeps on Jammin'." Jun. 19, 2000, available from http://db.tidbits.com/getbits.acgi?tbart=05988. downloaded Jul. 25, 2011 at http?..db.tidbits.com/article/5988?print?version+1 (U.S. Appl. No. 11/519,429).

"D-Link's New Wireless Media Device Plays Digital Music, Videos and Photos on Home Television and Stereo:" http://presslink.dlink.com/pr/?prid=136, dated Jan. 20, 2004, 2 pgs.

\* cited by examiner

CALIBRATING MEDIA PLAYBACK CHANNELS FOR SYNCHRONIZED PRESENTATION

TECHNICAL FIELD

The disclosure generally relates to synchronizing playback of audio/video data through multiple channels.

BACKGROUND

Various types of wired and/or wireless media systems are available in the market today. Many of these systems present audio and/or video data through multiple channels (e.g., devices, speakers, displays, earphones, etc.). For example, to play music throughout the whole house, a user may place different speakers in each room of the house. To simulate theater surround sound when watching movies, the user may place different speakers at different locations in a room with a television and/or other media device (e.g., streaming device, set top box, etc.). To avoid a discordant playback experience, the playback of audio and/or video at these various playback devices (e.g., speakers, television, etc.) must be synchronized so that each playback device is presenting the same media content at the same time.

SUMMARY

In some implementations, a computing device can calibrate media playback channels for presenting media content through a media system by determining the media propagation latency through the media system. For example, the computing device can send calibration content (e.g., audio data, video data, etc.) to various playback devices (e.g., playback channels) of the media system and record a timestamp indicating when the calibration content was sent. When the playback devices present the calibration content, a sensor device (e.g., remote control device, smartphone, etc.) can detect the presentation of the calibration content. The sensor device can send calibration data (e.g., media samples that may include the calibration content and/or a timestamp indicating when the media sample was detected by the sensor device) to the computing device. The computing device can determine the propagation latency (e.g., presentation delay) based on the calibration data received from the sensor device.

Particular implementations provide at least the following advantages. A media system can be calibrated for synchronous playback at multiple playback devices using different types of sensor devices (e.g., a dedicated remote-control device, smartphone, tablet computer, etc.). The media system can be calibrated for synchronous playback through third-party playback devices (e.g., Bluetooth speakers, Bluetooth headsets, etc.). The media system can be calibrated with or without explicit user input initiating the calibration process. For example, the calibration process can be performed in the background while the user performs other tasks on or with the sensor device. Thus, the calibration process can be performed automatically, dynamically, and/or frequently without burdening the user with providing explicit input to perform the calibration process.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

The technology described herein provides several mechanisms for calibrating media playback channels for synchronized playback. For example, a media device (e.g., a computing device, laptop computer, set-top-box, streaming media player, etc.) within a media system can determine and/or calculate the propagation latency of media content through various playback channels of the media system so that the media device can adjust the timing of transmission of media content through the playback channels in order to provide synchronized presentation of media content at playback devices (e.g., speakers, displays, televisions, earphones, headsets, etc.).

A playback channel can correspond to a communication path that media content travels from a sending (e.g., originating) media device through a playback device (e.g., including the playback device) that presents (e.g., audibly and/or visually) the media content to the user or users of the media system. The playback channel can be a wired playback channel (e.g., HDMI, RCA cables, coaxial cables, Ethernet, speaker wires, etc.) or wireless playback channel (e.g., Bluetooth, Wi-Fi, etc.) to a corresponding playback device (e.g., television, speaker, monitor, display, etc.).

The propagation latency (e.g., presentation delay) can correspond to the amount of time it takes for media content sent by the media device to be perceptibly presented (e.g., audibly or visually) for the user's consumption at a playback device (e.g., presentation time−transmission time=propagation latency). The media device can determine the propagation latency on each of a variety of playback channels (e.g., wired, wireless, Wi-Fi, Bluetooth, etc.) corresponding to a variety of playback devices (e.g., televisions, speakers, headphones, set-top-boxes, computing devices, etc.). The media device can then adjust the timing of when media content is sent to each channel based on the determined propagation latency for each channel so that the media content is presented synchronously (e.g., the same portion of media content is played at the same time) by the playback devices associated with each playback channel.

Figure 1:
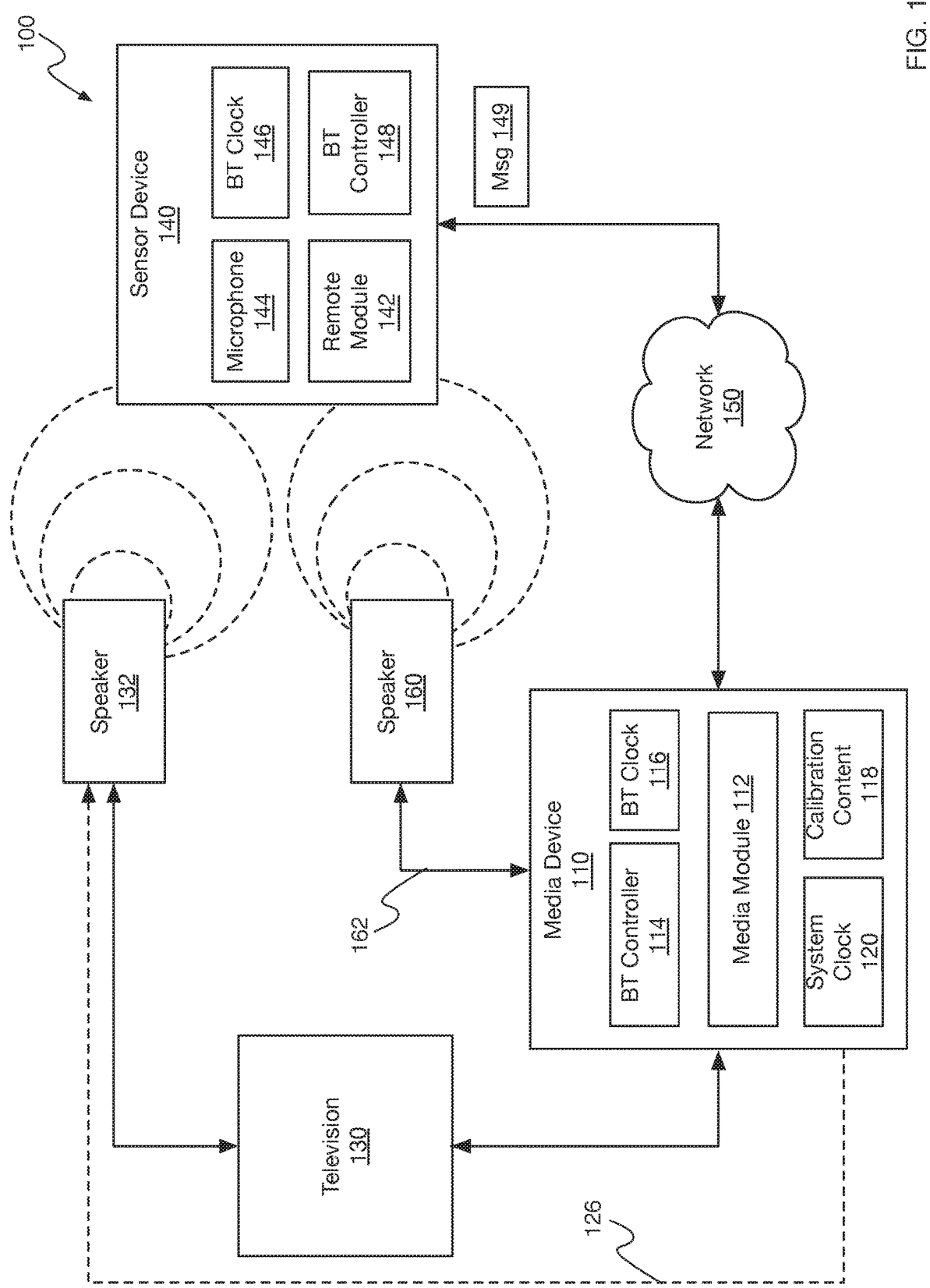
FIG. 1 is a block diagram of an example media system for calibrating media playback channels for synchronized playback based on a Bluetooth clock at a sensor device.

FIG. 1 is a block diagram of an example media system 100 for calibrating media playback channels for synchronized playback based on a Bluetooth clock at a sensor device. For example, the Bluetooth clock at the sensor device can be used by media system 100 to determine a time at which a playback device presented calibration content so that the propagation latency through media system 100 can be determined.

In some implementations, media system 100 can include media device 110. For example, media device 110 can be a computing device (e.g., laptop computer, set-top-box, streaming media player, smartphone, etc.) capable of streaming media to other playback devices. Media device 110 can stream media to other playback devices using a variety of wired (e.g., HDMI, RCA cables, coaxial cables, Ethernet, speaker wires, etc.) or wireless communication (e.g., Bluetooth, Wi-Fi, etc.) channels.

In some implementations, media device 110 can include media module 112. For example, media module 112 can be a software module configured to perform various media management functions on media device 110. Media module 112 can, for example, send media content (e.g., audio content, video content, etc.) for the user's enjoyment to various playback devices through respective playback channels according to output configurations specified by the user of media device 110. Media module 112 can manage the transmission of media content to the playback devices such that the playback devices present the media content in a synchronous manner. For example, media module 112 can adjust the timing of when media content is sent to the playback devices according to a propagation latency determined for each playback device and/or corresponding playback channel.

In some implementations, media module 112 can perform a calibration process to determine the propagation latency of each playback channel and/or corresponding playback device. For example, media module 110 can have a playback mode and a calibration mode. Media module 112 can normally operate in playback mode when sending media to various playback devices in response to a user request to play music, videos, movies, or some other media content for the user's entertainment. In some implementations, media module 112 can enter calibration mode to determine the propagation latency for the various playback channels and calibrate the various playback channels of media system 100 based on the determined propagation latency to ensure synchronized playback of media content on the playback channels and/or playback devices.

Media module 112 can enter calibration mode in a variety of ways. For example, media module 112 can enter calibration mode in response to the user providing input to media device 110. For example, media device 110 can present a graphical user interface on television 130 and the user can provide input selecting a calibration menu item to cause media module 112 to enter calibration mode.

As another example, media module 112 can enter calibration mode automatically when the user of sensor device 140 and/or media device 110 enables (e.g., turns on) microphone 144. For example, the user of sensor device 140 can press a button on sensor device 140 (e.g., a dedicated remote-control device) to enable voice input for providing input to media device 110. When microphone 144 is enabled, media module 112 can enter calibration mode to determine the propagation latency of the playback channels in media system 100 and calibrate the playback channels to enable synchronized playback of media content based on the sounds detected while microphone 144 is enabled. Thus, media system 100 can be automatically and dynamically (e.g., frequently) calibrated without burdening the user with providing explicit input to calibrate media system 100.

In some implementations, when media module 112 enters calibration mode, media module 112 can cause sensor device 140 to enter calibration mode. For example, media module 112 can send a message through network 150 (e.g., peer-to-peer Bluetooth, peer-to-peer Wi-Fi, local area network, etc.) to cause sensor device 140 and/or remote module 142 to enter calibration mode. When in calibration mode, remote module 142 can sample sounds detected by microphone 144 (e.g., or video captured by a camera of sensor device 140) so that media module 112 can determine when calibration content 118 was presented by a playback device (e.g., speaker 132, speaker 160, television 130, etc.) and determine the propagation latency, as described further below.

To determine propagation latency and perform the calibration process, media module 112 can send calibration content 118 to a playback device (or devices) through a corresponding playback channel (or channels). For example, media module 112 can send calibration content 118 through playback channel 126 (e.g., HDMI channel) to television 130 and speaker 132. Speaker 132 can be, for example, a speaker attached or connected to television 130.

In some implementations, calibration content 118 can be media content that includes audio content and/or video content specifically created for calibrating media system 100. In general, calibration content can be configured to include an initial media segment, followed by a calibration media segment (e.g., an audio or video pattern useful for calibration), followed by an ending media segment. The initial media segment and ending media segment can be configured to be pleasant sounding or visually appealing to the user such that they mask or make more tolerable the calibration media segment, which may be less appealing to the user. For example, the initial media segment and the ending media segment may be of a longer duration than the calibration media segment and, therefore less noticeable to the user. By configuring the calibration segment in between the initial and ending media segments, media module 112 can determine an offset at which the calibration media segment is presented within the calibration content. This offset may allow for greater precision when determining the propagation latency on a playback channel, as described further below with reference to FIG. 5. In the example of FIG. 1, calibration content 118 can include audio data to be presented by television 130 and/or speaker 132. However, in other implementations (e.g., FIG. 4), calibration content 118 can include video content.

As described above, the purpose of the calibration process is to determine the amount of time (e.g., propagation latency) it takes for calibration content 118 to be transmitted to and presented by speaker 132 after media module 112 sends the calibration content to television 130 and/or speaker 132 so that the output of media content from media module 112 can be calibrated (e.g., timed) for synchronized playback. For example, a significant source of latency in playback channel that includes a display device (e.g., television 130) is the video processing performed by the display device. Thus, the sending of media content through playback channels that do not include display devices, or other devices that perform video processing, may need to be delayed to accommodate the delay associated with the video processing performed at the display device in order to provide a synchronized playback experience for the user across all playback channels.

In some implementations, when sending calibration content 118, media module 112 can determine a time (e.g., transmission time) when calibration content 118 is sent based on system clock 120. For example, system clock 120 can be an internal clock used by media device 110 to perform various computing operations. In some implementations, system clock 120 can be synchronized with a network clock using well-known protocols. Media module 112 can record and/or store the system time at which calibration content 110 was sent to a playback device (e.g., television 130 and/or speaker 132) so that the transmission time can be compared to a presentation time when calibration content is presented by the playback device (e.g., as detected by sensor device 140) when calculating the propagation latency on a playback channel (e.g., playback channel 126).

When television 130 and/or speaker 132 receive calibration content 118, speaker 132 can present calibration content 118. For example, speaker 132 can present a sound or sounds corresponding to the audio data in calibration content 118 (e.g., a pleasant sound, followed by an audible test pattern, followed by a pleasant sound).

In some implementations, media system 100 can include sensor device 140. For example, sensor device 140 can be a computing device, such as a remote-control device, a smartphone, a tablet computer, or other device configured with sound and/or image sensors and capable of communicating with media device 110 through network 150 (e.g., a Bluetooth network, a Wi-Fi network, a peer-to-peer network, etc.). In the particular example of media system 100, sensor device 140 can correspond to a dedicated remote-control device for controlling and/or providing input to media device 110 using a Bluetooth connection.

In some implementations, sensor device 140 can include remote module 142. For example, remote module 142 can be a software module that provides the remote-control capabilities of sensor device 140 with respect to media device 110. Remote module 142 can obtain media samples (e.g., audio samples, video samples, etc.) generated by sensor device 140 and provide calibration data, including the media samples, to media module 112 for determining propagation latency through the various playback channels of media system 100.

In some implementations, sensor device 140 can include microphone 144 (e.g., sound sensor) for detecting sounds, such as voice commands for remotely controlling media device 110. Microphone 144 can also be used by remote module 142 to detect calibration content 118 presented by speaker 132, or any other audio playback device (e.g., speaker 160, headphones, etc.) when in calibration mode.

In some implementations, when remote module 142 is in calibration mode, remote module 142 can monitor the sounds detected by microphone 144 and periodically send calibration data to media device 110. For example, the calibration data can include media samples (e.g., sound samples, video samples, etc.) detected and/or generated by sensor device 140 using sound and/or image sensors of sensor device 140. The calibration data can include a timestamp indicating the time when the media sample in the calibration data was detected and/or generated by sensor device 140. While in calibration mode, remote module 142 can generate and send the calibration data on a periodic basis. For example, remote module 142 can periodically sample sensor data generated by sensors (e.g., sound sensor, image sensor, etc.) on sensor device 140 and generate calibration data for each sampling period. Remote module 142 can then send the calibration data for the sampling period, including a newly collected media sample for the current sampling period, to media device 110. For example, the sampling period can be 50 milliseconds, one second, etc., while in calibration mode. Each instance of calibration data may or may not include calibration content, and more importantly, may or may not include the calibration media segment. Thus, media module 112 on media device 110 can analyze each calibration data as it is received to determine whether the calibration data includes the calibration media segment, as described further below.

In some implementations, remote module 142 can use Bluetooth clock 146 to determine the timestamps for the calibration data. For example, sensor device 140 may not have a system clock. Remote module 142 can, therefore, obtain a current time (e.g., timestamp) using Bluetooth clock 146 when calibration data is generated. For example, the current time can be obtained from the Bluetooth clock 146 through an API (application programming interface) of Bluetooth controller 148. Remote module 142 can then store the timestamp in the calibration data that includes the media sample for the current sampling period. After generating calibration data for the current sampling period, remote module 142 can send message 149 to media device 110 that includes the calibration data generated by remote module 142 for the current sampling period.

When message 149 is received by media device 110, media module 112 can determine a system time corresponding to the Bluetooth time at which the sound sample included in message 149 was detected by sensor device 140. For example, as part of the Bluetooth communication protocol, Bluetooth clock 146 on sensor device 140 and Bluetooth clock 116 on media device 110 can be synchronized. However, Bluetooth clock 116 and system clock 120 on media device 110 may not be synchronized. Thus, when message 149 is received, media module can obtain the current time of Bluetooth clock 116 (e.g., from Bluetooth controller 114) and system clock 120 to determine a mapping between Bluetooth time and system time on media device 110. For example, media module 112 can determine an amount of time (e.g., 20 milliseconds, 5 seconds, 30 seconds, etc.) that the system time of system clock 120 is ahead (or behind) the Bluetooth time of Bluetooth clock 116. Media module 112 can then add (or subtract) this amount of time to (or from) the Bluetooth timestamp included in the calibration data to determine the system time at which the calibration data was generated and/or when the calibration media sample was detected by sensor device 140.

After determining the system time at which sensor device 140 generated the calibration data in message 149, media module 112 can determine a presentation time when the playback device began presenting calibration content 118. For example, media module 112 can determine the presentation time based on the time at which the playback device presented the calibration media segment as described below with reference to FIG. 5.

Media module 112 can then compare the system time (e.g., transmission time) at which media module 112 sent calibration content 118 to the playback device (e.g., television 130 and/or speaker 132) with the time (e.g., presentation time) at which the playback device presented calibration content 118 to determine the propagation latency (e.g., presentation delay) on playback channel 126. For example, media module 112 can subtract the transmission time from the presentation time to determine the propagation latency on playback channel 126.

In some implementations, media module 112 can determine the propagation latency through other (e.g., additional) playback channels in a similar manner as described above with reference to playback channel 126. For example, while media system 100 is in calibration mode, media module 112 can send calibration content 118 to speaker 160 (e.g., smart speaker, Bluetooth speaker, headphones, wireless earbuds, etc.) through playback channel 162. Calibration content 118 sent through playback channel 162 can include the same calibration media segment (e.g., audio pattern, video pattern, etc.) as the calibration content sent through playback channel 126. Calibration content 118 sent through playback channel 162 can include a different calibration media segment (e.g., audio calibration pattern, video calibration pattern, etc.) than the calibration content sent through playback channel 126. Sensor device 140 can then detect calibration content 118 presented by speaker 160, generate calibration data, and send the calibration data to media device 110 so that media module 112 can determine the propagation latency through playback channel 162, as described above.

In some implementations, media module 112 can send calibration content 118 to playback channel 126 and playback channel 162 simultaneously. For example, media module 112 can determine all of the playback channels (e.g., playback channel 126, playback channel 162, etc.) or playback devices (e.g., television 130, speaker 132, speaker 160, etc.) through which, or to which, media device 110 is configured to send media content. Media module 112 can then send calibration content 118 through each channel and/or to each playback device so that the playback devices present calibration content 118 when received at the playback devices. As described above, calibration content 118 can include the same calibration media segment for each playback channel or calibration content 118 can include different calibration media segments for each playback channel. For example, by sending different calibration media segments to each playback channel, media module 112 can determine which calibration data (e.g., detected calibration media segment) corresponds to which playback channel by matching the calibration media segment in the calibration data to the calibration media segment sent to each playback channel by media module 112.

In any case, the playback devices can present calibration content 118 when calibration content 118 is received by the playback devices. Due to the differences in propagation latency on each channel (e.g., channel 126, channel 162, etc.) the calibration content 118 may be presented by each playback device at different times or at the same time. However, sensor device 140 can detect the calibration content 118 presented by each playback device (e.g., television 130, speaker 132, and/or speaker 160), generate calibration data, and send the calibration data to media device 110 so that media module 112 can calculate the propagation latency for each playback channel 126 and/or 160 based on the calibration data for each channel, as described herein.

In some implementations, media module 112 can use the propagation latency calculated for each playback channel to synchronize media content playback across playback channels. For example, video processing (e.g., performed by television 130) is usually the source of the greatest amount of propagation latency within media system 100. So, if media module 112 determines that playback channel 126 (e.g., television 130, speaker 132) has a propagation latency of two (2) seconds, and that playback channel 162 (e.g., speaker 160) has a propagation latency of one (1) second, then, when sending media content to playback devices for presentation, media module 112 can send the media content to television 130 and/or speaker 132 one second before media module 112 sends the media content to speaker 160. Stated differently, media module 112 can delay sending the media content to speaker 160 by one second after sending the media content to television 130 and/or speaker 132 so that television 130, speaker 132, and/or speaker 160 all present the media content at the same time. Thus, media module 112 can calibrate the transmission of media content on the various playback channels based on the determined propagation latency determined for each playback channel so that the playback devices associated with each playback channel present media content simultaneously and in synchronization with the other playback devices.

Figure 2:
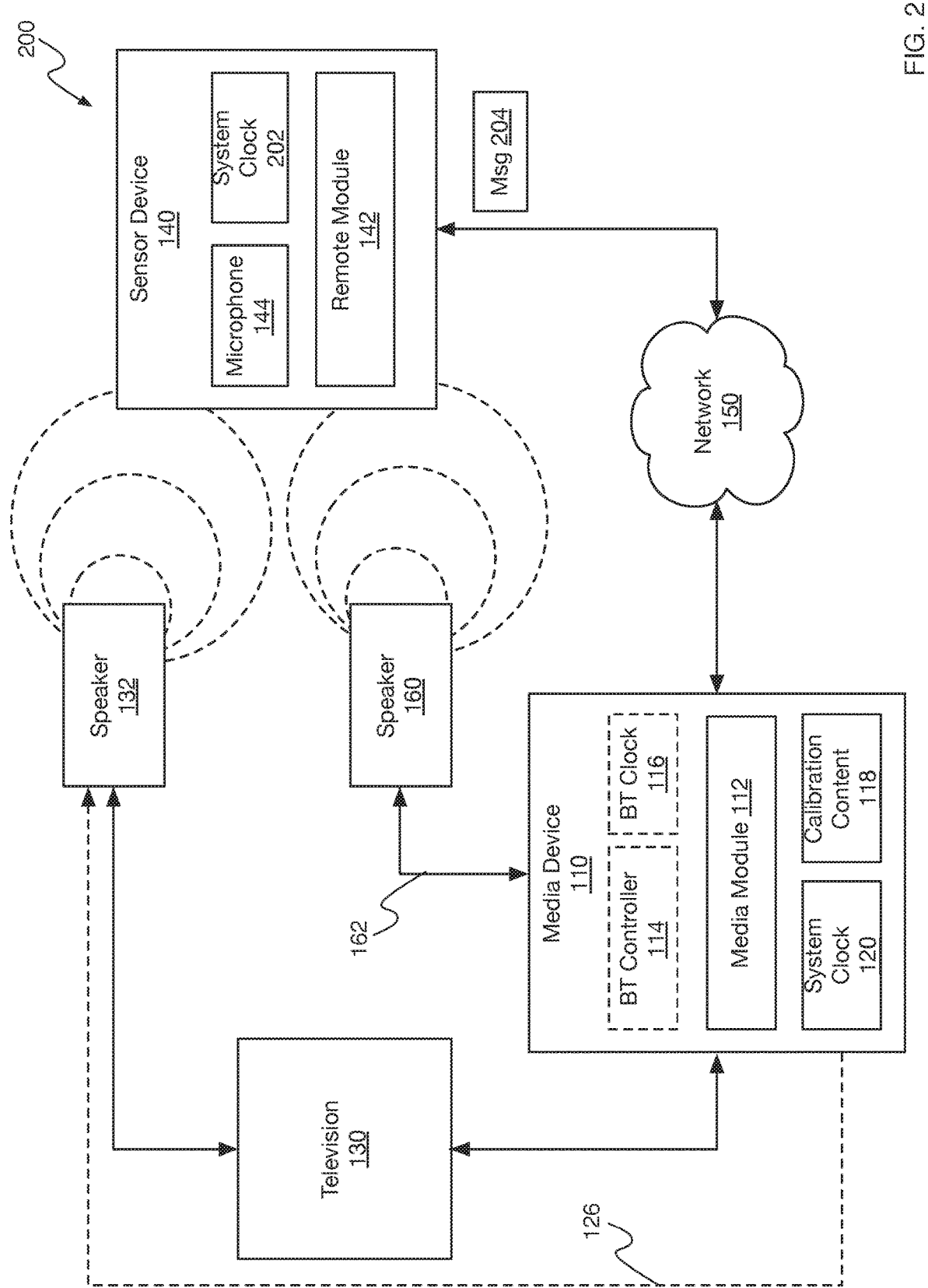
FIG. 2 is a block diagram of an example media system for calibrating media playback channels for synchronized playback based on a system clock at a sensor device.

FIG. 2 is a block diagram of an example media system 200 for calibrating media playback channels for synchronized playback based on a system clock at a sensor device. For example, media system 200 can correspond to system 100, described above. In some implementations, a system clock at the sensor device can be used by media system 100 to determine a time at which a playback device presented calibration content so that the propagation latency through media system 100 can be determined. For example, sensor device 140 can be a computing device (e.g., smartphone, tablet computer, etc.) that includes system clock 202. The calibration of media system 200 can be performed similarly to the calibration of media system 100, as described above, however the timestamp for the calibration data can be determined based on system clock 202 of sensor device 140 rather than Bluetooth clock 146. System clock 202 can be synchronized with system clock 120 of media device 110 using well-known network protocols. Thus, media module 112 can use the calibration data timestamp directly (e.g., without converting Bluetooth clock time to system time) when determining the propagation latency of each playback channel.

To calibrate the playback channels of system 200, media module 112 can send a notification to sensor device 140 to cause sensor device 140 (e.g., a smartphone, tablet computer, smartwatch, other computing device, etc.) to enter calibration mode when media module 112 of media device 110 enters calibration mode. As described above, media module 112 can enter calibration mode when the user selects a calibration menu item presented by media module 112 on television 130. For example, sensor device 140 can present the calibration notification on a display of sensor device 140. The user of sensor device 140 can provide input in response to the notification to cause remote module 142 to enter calibration mode.

Alternatively, the user of sensor device 140 can invoke remote module 142 (e.g., a software application) on sensor device 140 and provide input to remote module 142 to cause remote module 142 and/or media module 112 on media device 110 to enter calibration mode. When in calibration mode, remote module 142 can sample (e.g., record for a period of time) the sensor data generated by microphone 144 and generate calibration data on a periodic basis, as described above.

When remote module 142 generates calibration data, remote module 142 can determine the time at which the media sample was collected by requesting the current time from system clock 202. Remote module 142 can include the sample time in the calibration data and send the calibration data to media module 112 on media device 110 in message 204.

When message 204 is received by media module 112, media module 112 can determine the system time at which sensor device 140 generated the calibration data in message 204 based on the timestamp in the calibration data. After determining the system time at which sensor device 140 generated the calibration data in message 204, media module 112 can determine a presentation time when the playback device began presenting calibration content 118. For example, media module 112 can determine the presentation time based on the time at which the playback device presented the calibration media segment as described below with reference to FIG. 5.

To determine the propagation latency on the playback channels, media module 112 can calculate the difference between the system time when media module 112 sent calibration content 118 to the playback devices and the presentation time (e.g., system time) to determine the propagation latency on each playback channel. After the propagation latency is determined for each playback channel, media module 112 can calibrate the transmission of media content on each playback channel so that each playback device associated with the playback channels presents the media content synchronously, as described above.

Figure 3:
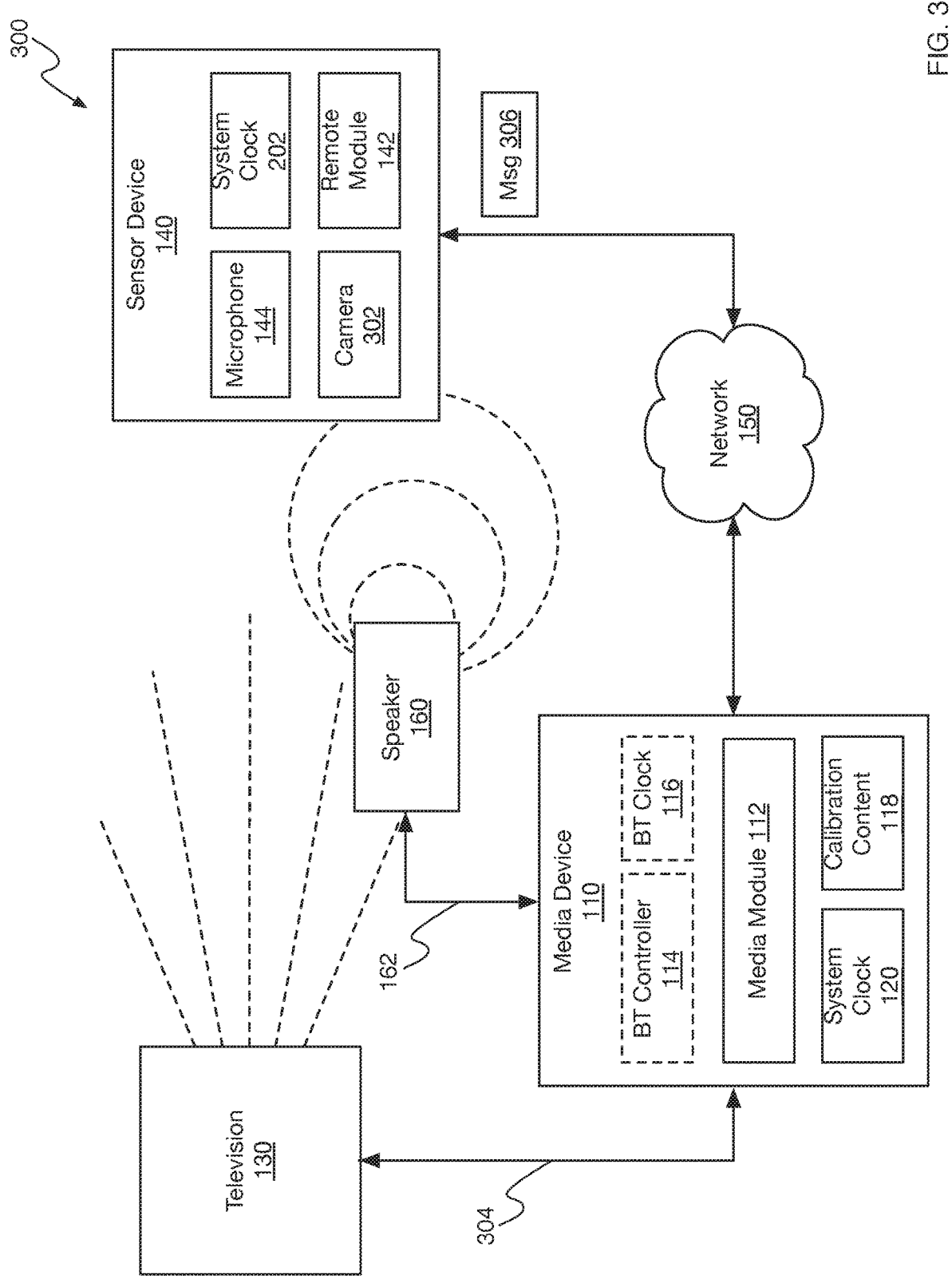
FIG. 3 is a block diagram of an example media system for calibrating media playback channels for synchronized playback based on visual calibration content detected at a sensor device.

FIG. 3 is a block diagram of an example media system 300 for calibrating media playback channels for synchronized playback based on visual calibration content detected at a sensor device. For example, media system 300 can correspond to system 200, described above. However, instead of determining the propagation latency of playback channel 304 based on audio calibration content, media system 300 can determine the propagation latency of playback channel 304 using video calibration content. Like media system 200, media system 300 can use the system clock at the sensor device to determine a time at which a sample of the video calibration content was detected by camera 302 so that the propagation latency through media system 300 (e.g., playback channel 304) can be determined. Since playback channel 162 to speaker 160 does not include a video playback device, the propagation latency through playback channel 162 can be (e.g., simultaneously or separately) determined using audio calibration content, as described above.

In some implementations, media module 112 can determine the type and/or capabilities of playback devices to which media module 112 is configured to send media content. For example, when establishing playback channel 304 to television 130, media module 112 can determine that television 130 is a type of playback device that is capable of presenting audio and video content. When establishing playback channel 162 to speaker 160, media module 112 can determine that speaker 160 is a type of playback device that is capable of only presenting audio content. Thus, when sending calibration content 118 to television 140 and/or speaker 160, media module 112 can select video and/or audio calibration content according to the capabilities of the playback devices associated with each playback channel. Alternatively, calibration content 118 can include both audio and video calibration content and the playback devices can present the audio and/or video content according to the capabilities of the playback devices.

In the example of FIG. 3, media module 112 can select to send video calibration content to television 130 and audio calibration content to speaker 160 and record the system time at which the calibration content was sent to each playback device. When television 130 receives the video calibration content 118, television 130 can present the video calibration content on a display of television 130.

In some implementations, sensor device 140 can be configured with camera 302 and/or microphone 144. Sensor device 140 can use microphone 144 (e.g., a sound sensor) to detect the presentation of audio calibration content 118 by speaker 160, as described above. Sensor device 140 can use camera 302 (e.g., an image sensor) to detect the presentation of video calibration content 118 by television 130. For example, when media module 112 enters calibration mode, media module 112 can send a notification to sensor device 140 (e.g., a smartphone, tablet computer, etc.). The notification can include information indicating that media device 110 has entered calibration mode. The notification can include information indicating the type of calibration content (e.g., video content, audio content, etc.) to be used for the calibration of media system 300. Sensor device 140 can present the calibration notification on the display of sensor device 140.

When the user of sensor device 140 selects or interacts with the calibration notification presented on sensor device 140 to cause sensor device 140 to enter calibration mode, remote module 142 can present instructions for performing the video calibration of media system 300. For example, when sensor device 140 enters calibration mode, remote module 142 can enable (e.g., turn on) microphone 144 and/or camera 302 and instruct the user to orient sensor device 140 so that the lens of camera 302 is directed at television 130. Thus, when television 130 presents the video calibration content (e.g., calibration content 118), camera 302 can detect the presentation of the video calibration content. For example, when in calibration mode, remote module 142 can sample (e.g., record for a period of time) the sensor data generated by camera 302 and generate calibration data on a periodic basis, as described above.

When remote module 142 generates calibration data, remote module 142 can determine the time at which the media sample was collected by requesting the current time from system clock 202. Remote module 142 can include the sample time in the calibration data and send the calibration data to media module 112 on media device 110 in message 306.

When message 306 is received by media module 112, media module 112 can determine the system time at which sensor device 140 generated the calibration data in message 306 based on the timestamp in the calibration data. After determining the system time at which sensor device 140 generated the calibration data (e.g., sample data) in message 306, media module 112 can determine a presentation time when the playback device began presenting calibration content 118. For example, media module 112 can determine the presentation time based on the time at which the playback device presented the calibration media segment as described below with reference to FIG. 5.

To determine the propagation latency on the playback channels, media module 112 can calculate the difference between the system time when media module 112 sent calibration content 118 to the playback devices and the presentation time (e.g., system time) to determine the propagation latency on each playback channel. After the propagation latency is determined for each playback channel, media module 112 can calibrate (e.g., adjust the timing of) the transmission of media content on each playback channel so that each playback device associated with the playback channels presents the media content synchronously, as described above.

Figure 4:
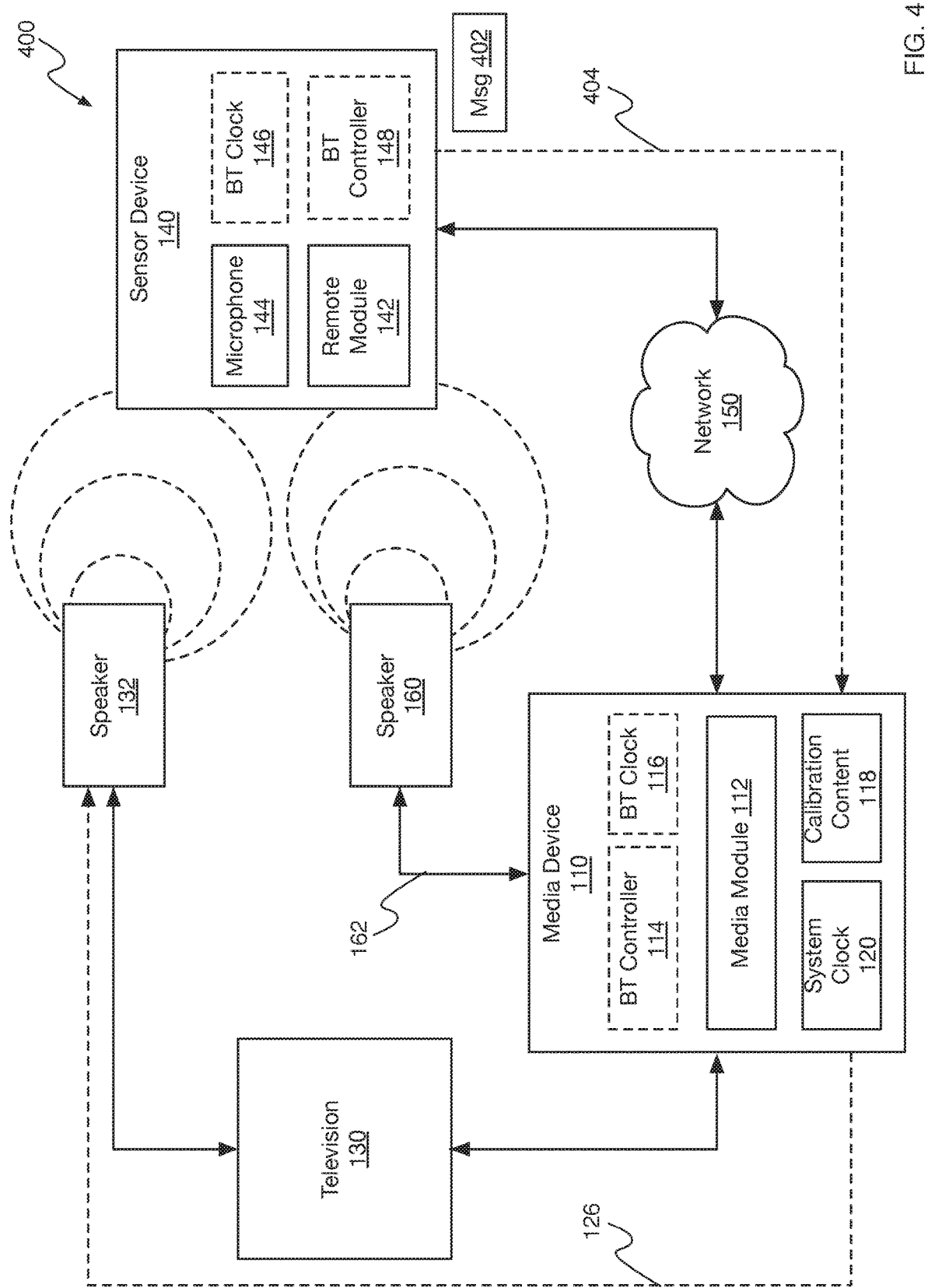
FIG. 4 is a block diagram of an example media system for calibrating media playback channels for synchronized playback based on a time when calibration data is received at the sending media device.

FIG. 4 is a block diagram of an example media system 400 for calibrating media playback channels for synchronized playback based on a time when calibration data is received at the sending media device. For example, system 400 can correspond to system 100, described above. However, in system 400, remote module 142 may not have access to Bluetooth clock 146 (or a system clock) to determine when calibration content is presented by playback devices and/or detected by microphone 144. Thus, media system 400 can be configured to determine propagation latency based on the system clock of media device 110 and a time in flight for transmitting calibration content from sensor device 140 to media device 110. For example, media module 112 can calculate the time (e.g., sample time) at which sensor device 140 generated the media sample in the calibration data by subtracting the time in flight (e.g., the amount of time it takes to transmit data from sensor device 140 to media device 110 through communication channel 404) from the time (e.g., received time) at which media module 112 received message 402, including detected calibration content 118, was received by media device 110.

After determining the system time (e.g. sample time) at which sensor device 140 generated the calibration data in message 402, media module 112 can determine a presentation time when the playback device began presenting calibration content 118. For example, media module 112 can determine the presentation time based on the time at which the playback device presented the calibration media segment as described below with reference to FIG. 5.

In some implementations, media module 112 can send calibration content 118 to playback devices through various playback channels. For example, media module 112 can send calibration content 118 to television 130 and/or speaker 132 through playback channel 126, as described above. Media module 112 can send calibration content 118 to speaker 160 through playback channel 162, as described above.

In some implementations, when remote module 142 is in calibration mode, remote module 142 can monitor the sounds detected by microphone 144 and periodically send calibration data to media device 110. For example, the calibration data can include media samples (e.g., sound samples, video samples, etc.) detected and/or generated by sensor device 140 using sound and/or image sensors of sensor device 140. However, in the example of FIG. 4, remote module 142 may not have access to any clock (e.g., Bluetooth clock 146) on sensor device 140 (e.g., sensor device 140 may just be a remote-control device with no system clock). Thus, remote module 142 can send calibration data, including media samples, without a corresponding timestamp indicating when the calibration data and/or media samples were generated.

While in calibration mode, remote module 142 can generate and send the calibration data on a periodic basis. For example, remote module 142 can periodically sample sensor data generated by sensors (e.g., sound sensor, image sensor, etc.) on sensor device 140 and generate calibration data for each sampling period. Remote module 142 can then send the calibration data for the sampling period, including newly collected media samples, to media device 110. For example, the sampling period can be 50 milliseconds, one second, etc., while in calibration mode. Each instance of calibration data may or may not include calibration content, and more importantly, may or may not include the calibration media segment. Thus, media module 112 can analyze each calibration data as it is received to determine whether the calibration data includes the calibration media segment, as described further below. After generating calibration data for the current sampling period, remote module 142 can send message 402, including the calibration data generated by remote module 142, to media device 110.

When media device 110 receives message 402, media module 112 can calculate the difference (e.g., roundtrip time) between the system time at which media module 112 sent the calibration content to the playback device(s) and the time at which media module 112 received message 402. Media module 112 can then subtract a time in flight value from the roundtrip time to determine (e.g., estimate) when sensor device 140 generated the calibration data and/or media sample included in message 402.

In some implementations, the time in flight value can be determined based on the amount of time it takes for a message transmitted by sensor device 140 to be received by media device 110. For example, the time in flight value can be determined based on the Bluetooth clocks at sensor device 140 and media device 110. For example, although remote module 142 may not have access to Bluetooth clock 146 for determining a time at which calibration content 118 was detected by sensor device 140, Bluetooth controller 148 may include a Bluetooth clock time in message 402 indicating a time at which message 402 was transmitted by sensor device 140 as part of the Bluetooth communication protocol. When message 402 is received at media device 110, Bluetooth controller 114 can determine, based on Bluetooth clock 116, a Bluetooth time at which message 402 was received. Bluetooth controller 114 can determine the time in flight by calculating the difference between the Bluetooth time (e.g., transmission time) in message 402 and the Bluetooth time at which message 402 was received at media device 110. This calculated time in flight can be provided to media module 112. Media module 112 can then subtract the time in flight from the roundtrip time to determine the when the calibration data and/or media sample in message 402 was generated.

In some implementations, the time in flight value can be a statistical value (e.g., minimum value) determined from the time in flight values calculated for many messages sent from sensor device 140 to media device 110. For example, over time, sensor device 140 can send many (e.g., hundreds, thousands, etc.) Bluetooth messages to media device 110. Media module 112 can store the time in flight values generated for each of the messages received from sensor device 140 over a period of time (e.g., all time, previous week, previous hour, etc.). In some implementations, media module 112 can determine a minimum time in flight value from among all of the messages and use the minimum time in flight value when calculating the propagation latency based on time in flight between sensor device 140 and media device 110, as described above. In some implementations, media module 112 can calculate other statistical time in flight values, such as median, average, etc., and use one of these other statistical time in flight values when calculating the propagation latency based on time in flight between sensor device 140 and media device 110, as described above.

After determining the system time at which sensor device 140 generated the calibration data in message 149, media module 112 can determine a presentation time when the playback device began presenting calibration content 118. For example, media module 112 can determine the presentation time based on the time at which the remote device 142 generated the calibration data and/or media sample as described below with reference to FIG. 5.

Media module 112 can then compare the system time (e.g., transmission time) at which media module 112 sent calibration content 118 to the playback device (e.g., television 130) with the time (e.g., presentation time) at which the playback device presented calibration content 118 to determine the propagation latency (e.g., delay) on playback channel 304. For example, media module 112 can subtract the transmission time from the presentation time to determine the propagation latency on playback channel 304.

After calculating the propagation latency on each playback channel using the time in flight calculation described above, media module 112 can calibrate each playback channel based on the propagation latency calculated for each playback channel, as described above.

Figure 5:
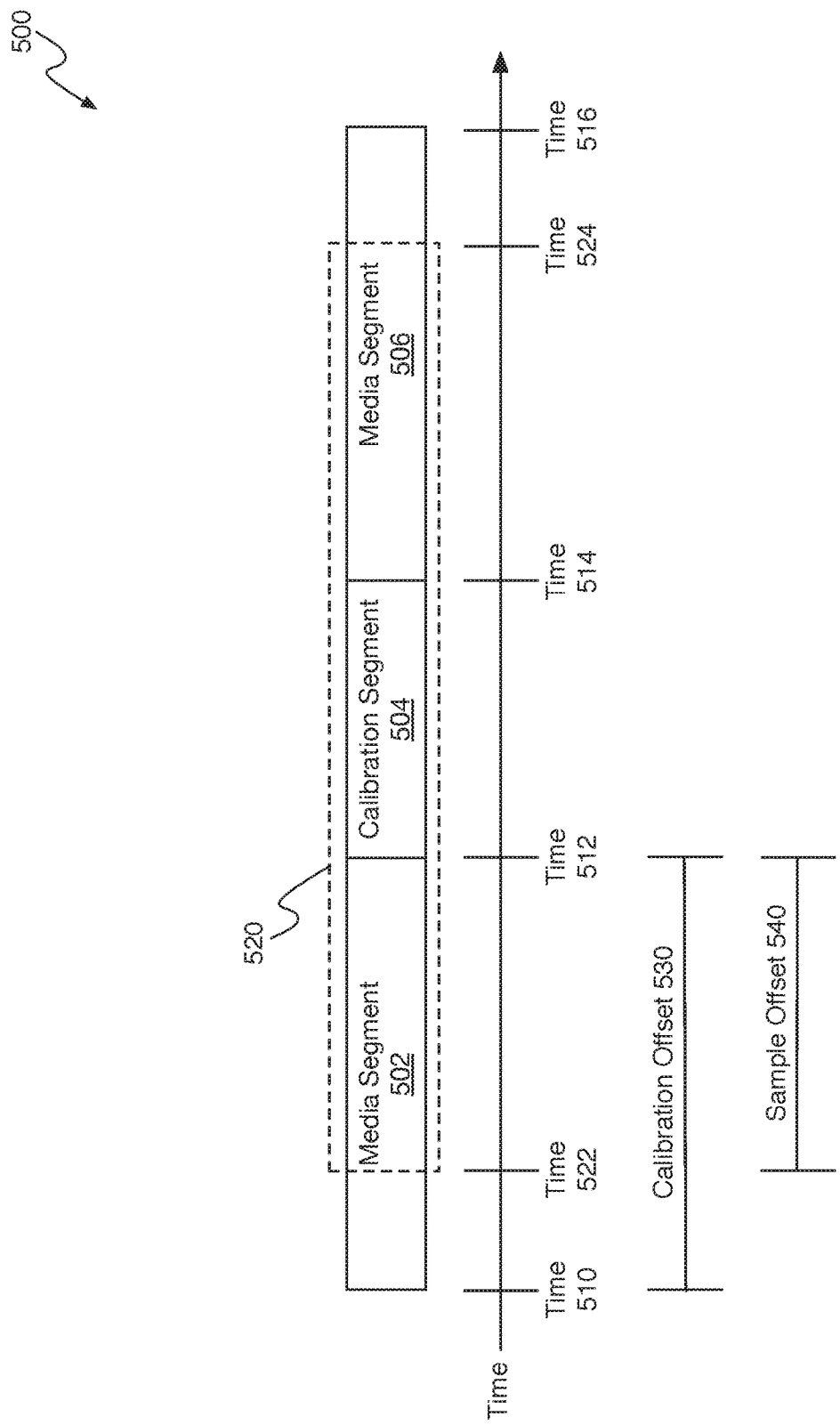
FIG. 5 illustrates an example calibration content for determining propagation latency on a communication channel of a media system.

FIG. 5 illustrates an example calibration content 500 for determining propagation latency on a communication channel of a media system. For example, calibration content 500 can correspond to calibration content 118 of media systems 100, 200, 300, and/or 400, described above. As described above, calibration content 500 can include video content and/or audio content.

In some implementations, calibration content 500 can include a beginning media segment 502, a calibration segment 504, and an ending media segment 506. For example, media segment 502 and media segment 504 can include some audibly or visually pleasing media. Calibration segment 504 can include an audio or video pattern that can be matched by media device 110 when performing the calibration processes described herein. For example, media module 112 can match calibration segment 504 to audio and/or video sample data to determine whether the sample data includes the calibration segment when determining when calibration segment 504 was presented by a playback device. When presented by a playback device (e.g., television 130, speaker 132, speaker 160, etc.), the playback device can present media segment 502 for a first duration of time (e.g., time 512–time 510), calibration segment 504 for a second duration of time (e.g., time 514–time 512), and media segment 506 for a third duration of time (e.g., time 516–time 514). For example, the duration of calibration segment 504 can be shorter than the durations of media segment 502 and/or 506. Thus, calibration content 500 can be presented for a total duration of time (e.g., time 516–time 510).

In some implementations, sensor device 140 can capture a sample of sensor data that includes a portion of calibration content 500. For example, sensor device 140 can capture sample 520. Sample 520 can be a sample of audio data or video data captured and/or generated by a sound sensor (e.g., microphone) or image sensor (e.g., camera) of sensor device 140. As described above, remote module 142 can sample the sensor data on a periodic basis while in calibration mode. Sample 520 is an example of the sample data generated by remote module 142. Sample 520 can be sent by remote module 142 in calibration data to media device 110. The time indicated in the calibration data can correspond to time 522 when sample 520 was captured or generated by remote module 142.

As illustrated by FIG. 5, sample 520 can be generated at time 522 and end at 542. Thus, sample 520 may not include all of calibration content 500 (e.g., running from time 510 to time 516. Moreover, the beginning of sample 520 (e.g., time 522) may not coincide with the beginning of calibration content 500 (e.g., time 510). For example, the difference between the time (e.g., time 510) when the playback device started presenting calibration content 500 and the time when media module 112 sent calibration content 500 to the playback device is the propagation latency for the communication channel to the playback device so media module 112 needs to determine time 510 to calculate the propagation latency.

In some implementations, media module 112 can use calibration segment 504 to determine when the playback device started presenting calibration content 500 even though the beginning of calibration content 500 at time 510 is not part of sample 520. For example, media module 112 can determine a calibration time offset 530 for calibration segment 504. For example, calibration time offset 530 can correspond to the difference between time 512 (e.g., the beginning of calibration segment 504) and time 510 (e.g., the beginning of calibration content 500). Media module 112 can use the calibration time offset 530 for calibration segment 504 to determine when a playback device began presenting calibration content 500. For example, if media module 112 can determine a time when calibration segment 504 was presented, then media module 112 can subtract calibration offset 530 from this time to determine when a playback device started presenting calibration content 500. This "start time" or presentation time can be used by media module 112 to calculate the propagation latency from media device 110 through the playback device that presented calibration content 500.

In some implementations, when media module 112 receives calibration data including sample 520 from sensor device 140, media module 112 can analyze sample 520 to determine a sample time offset 540 corresponding to when calibration segment 504 begins within sample 520 (e.g., the difference between time 522 and time 512). For example, calibration segment 504 may begin at a sample time offset 540 of one (1) second from the beginning of sample 520.

When calibration data is sent to media module 112, media module 112 can determine a time at which sample 520 was generated (e.g., the time at which the beginning of sample 520 was captured). For example, the calibration data time can be obtained from the calibration data itself (e.g., the system or Bluetooth clock time determined at sensor device 140) or can be derived from the time in flight calculations, as described above.

To determine the time when calibration content 500 was first presented (e.g., time 510), media module 112 can add the sample time offset 540 to the calibration data time (e.g., time 522) and subtract the calibration time offset 530. The result of these calculations can correspond to the presentation time for the calibration content. For example, the presentation time corresponds to the time when a playback device began presenting calibration content 500.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 6:
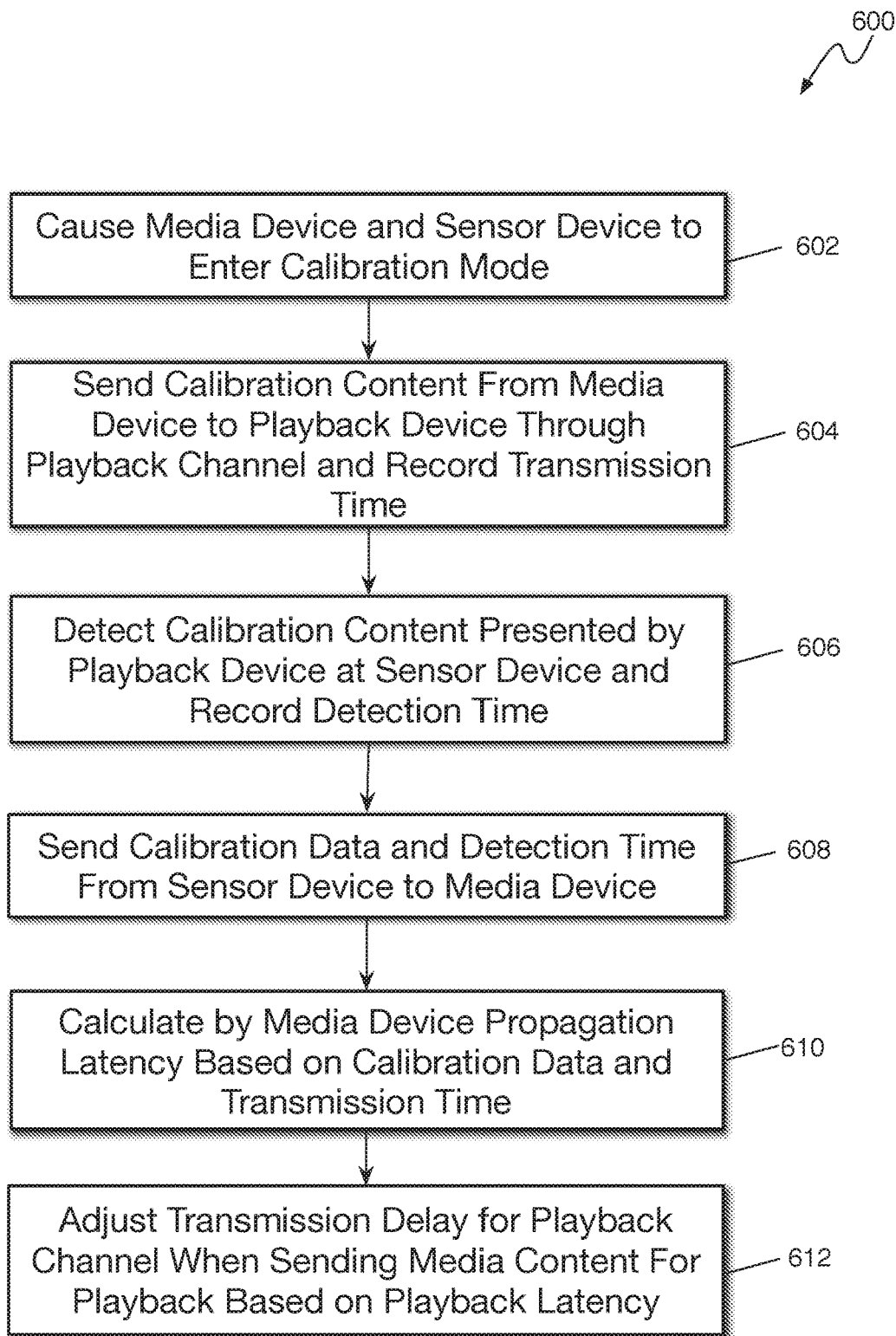
FIG. 6 is flow diagram of an example process for calibrating media playback channels for synchronized presentation based on a detection time determined by a sensor device.

FIG. 6 is flow diagram of an example process 600 for calibrating media playback channels for synchronized presentation based on a detection time determined by a sensor device. For example, process 600 can be performed by media systems 100, 200, and/or 300, as described above. Process 600 can be performed to determine the propagation latency for each playback channel (e.g., including playback devices) in media systems 100, 200, and/or 300. The propagation latency determined for each playback channel can then be used by media device 110 to adjust the transmission times of media content through each playback channel so that the media content is presented in a synchronous manner across all playback devices.

At step 602, media device 110 can cause media device 110 and sensor device 140 to enter calibration mode. For example, media device 110 can receive explicit user input indicating that the user wishes to calibrate media system 100, 200, and/or 300. The user input can be received by media device 110 through a remote control (e.g., sensor device 140) associated with media device 110.

In some implementations, media device 110 can detect when the user activates a sensor (e.g., microphone, camera, etc.) on sensor device 140 and take the opportunity (e.g., without explicit user input) to calibrate media system 100, 200, and/or 300. For example, the user may enable the microphone on sensor device 140 to provide voice input to media device 110. Media device 110 can receive a message from sensor device 140 indicating that the microphone is active or turned on and cause media device 110 and sensor device 140 to enter calibration mode. Thus, media device 110 can cause media device 110 and sensor device 140 to enter calibration mode opportunistically when the user enables a calibration sensor (e.g., microphone, camera, etc.) on sensor device 140.

In some implementations, media device 110 can periodically calibrate media system 100, 200, and/or 300. For example, media device 110 can calibrate media system 100, 200, and/or 300 on a recurring, periodic basis (e.g., daily, weekly, etc.). If media device 110 has not recently calibrated media system 100, 200, and/or 300, media device 110 can automatically enter calibration mode at the end of the configured period and send a notification to sensor device 140 to cause sensor device 140 to enter calibration mode. For example, a user of sensor device 140 can interact with the notification to allow sensor device 140 to enter calibration mode and activate the calibration sensors (e.g., microphone, camera, etc.) on sensor device 140, as described above.

At step 604, media device 110 can send calibration content to a playback device through a playback channel and record the transmission time. For example, media device 110 can determine the sensor capabilities (e.g., sound sensor—microphone, image sensor—camera, etc.) of sensor device 140. Media device 110 can determine the media presentation capabilities (e.g., audio only, audio and video, etc.) of the playback devices in media system 100, 200, and/or 300. Media device 110 can select calibration content to send to each playback device on each playback channel based on the determined capabilities of sensor device 140 and the playback devices. For example, when sensor device 140 can only detect sound (e.g., is configured with only a microphone), then media device 110 can send audio calibration data to the various playback devices in media system 100, 200, and/or 300. When sensor device 140 can detect sound and images, media device 110 can select audio or video calibration data according to the output capabilities of the playback devices. For example, video calibration data can be sent to playback devices having displays. Audio calibration data can be sent to playback devices having speakers. When sending calibration data to a playback device over a playback channel, media device 110 can record the local system time (e.g., using the system clock of media device 110) at which the calibration data was sent over the playback channel. When the playback device receives the calibration data, the playback device can present the calibration data (e.g., using a display or speakers of the playback device).

At step 606, sensor device 140 can detect calibration content presented by a playback device and record the detection time. For example, when in calibration mode, the calibration sensor(s) of sensor device 140 may remain enabled (e.g., active, turned on) such that sounds and/or images corresponding to the calibration content presented by playback devices can be detected by sensor device 140. Remote module 142 can sample (e.g., periodically record) the sounds and/or images detected by sensor device 140 when in calibration mode. Remote module 142 can record the time at which each sample is recorded and/or calibration data is generated. For example, sensor device 140 can record the current Bluetooth clock time or the current system time on sensor device 140 when sampling the sensor data and/or generating the calibration data. Sensor device 140 may record the current Bluetooth time when a system clock is unavailable on sensor device 140.

At step 608, sensor device 140 can send the calibration data to media device 110. For example, remote module 142 can send the calibration data for the current sampling period to media device 140.

In some implementations, steps 606 and 608 can be performed repeatedly while in calibration mode. For example, remote module 142 can sample the data generated by the calibration sensors (e.g., microphone, camera, etc.) on sensor device 140 on a periodic basis (e.g., every 50 milliseconds, every one second, etc.), store the sensor data (e.g., detected calibration data), record the current time for the current sample, and send the current sample and the current time to media device 110 for analysis. Remote module 142 may iterate through many sampling periods while in calibration mode. Thus, remote module 142 may send many instances of calibration data to media module 112 on media device 110.

At step 610, media device 110 can calculate the propagation latency based on the calibration data and the transmission time of the calibration content. For example, media module 112 can analyze each instance of calibration data to determine which instance, or instances when multiple playback channels are calibrated, of calibration data include a calibration segment (e.g., the audio and/or video calibration pattern). When media module 112 identifies an instance of calibration data that includes the calibration segment, media module 112 can determine the time at which the calibration segment of the calibration data (e.g., sampled sensor data) was presented by a playback device and/or received by sensor device 140. For example, the time at which the calibration segment was presented can be determined by adding the sample offset to the time (e.g., sample time) indicated in the calibration data. Media module 112 can then determine the time (e.g., presentation time) at which the calibration content was presented by the playback device based on the calibration offset of the calibration segment, as described above. Media module 112 can then calculate the propagation latency based on the difference between the transmission time of the calibration content and the presentation time of the calibration segment. For example, media module 112 can subtract the transmission time recorded when calibration content 118 was sent to the playback device through the playback channel from the presentation time determined based on the calibration data.

At step 612, media device 110 can adjust the transmission delay for the playback channel when sending media content for playback based on the playback latency determined for the playback channel. For example, media module 112 can compare the presentation latency for the playback channel to the presentation latencies calculated for other playback channels and adjust the playback delays (e.g., an amount of time for delaying sending the media content) for each playback channel to accommodate the playback channel that has the longest presentation latency. For example, if playback channel 126 has a presentation latency of 5 seconds and playback channel 162 has a playback latency of 2 seconds, then media module 112 can delay sending media content on playback channel 162 for 3 seconds after sending the same media content on playback channel 126 so that the media content will be presented simultaneously by the playback devices associated with each playback channel.

Figure 7:
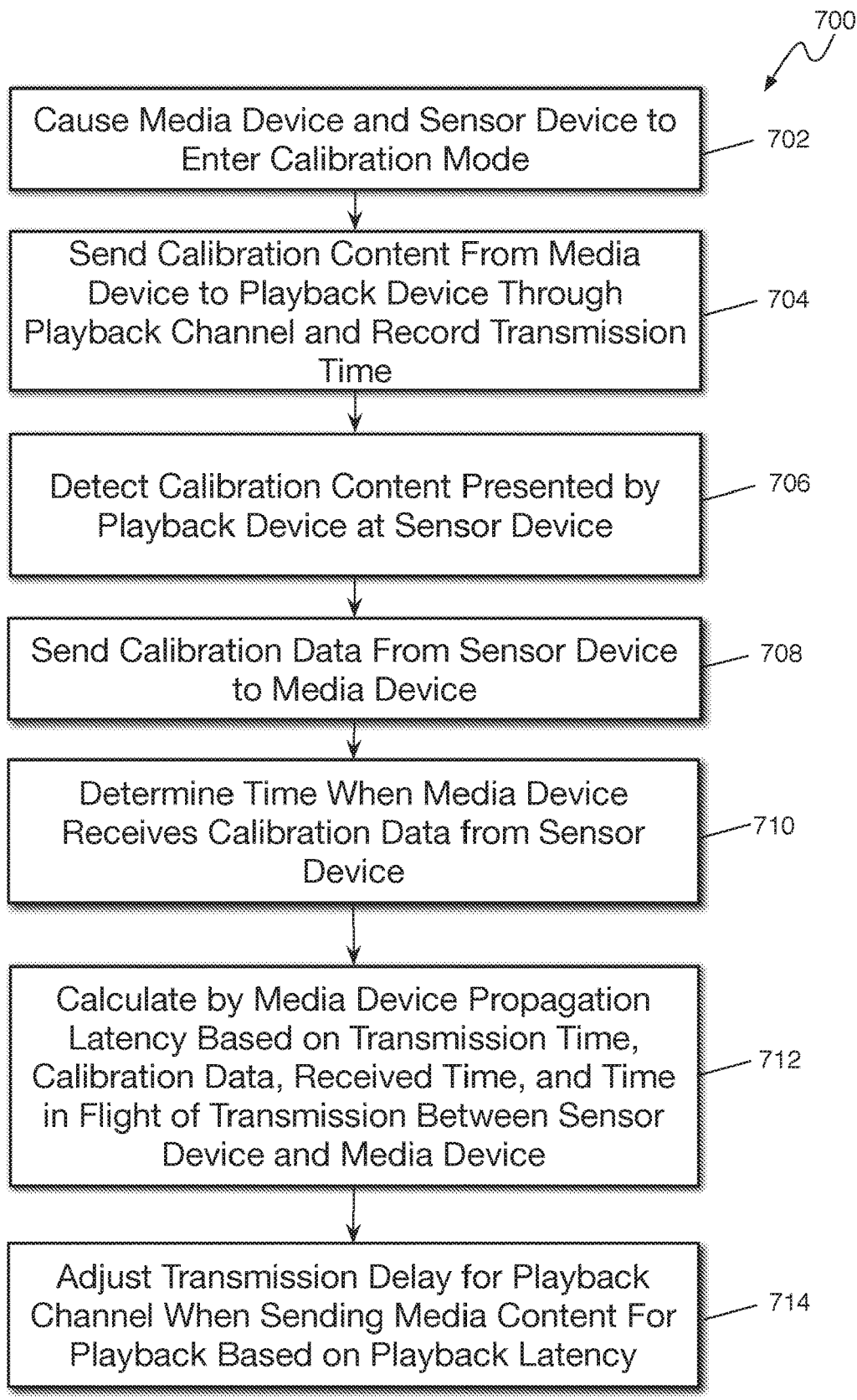
FIG. 7 is flow diagram of an example process for calibrating media playback channels for synchronized presentation based on a received time determined by a media device and a time in flight for transmitting data between the sensor device and the media device.

FIG. 7 is flow diagram of an example process 700 for calibrating media playback channels for synchronized presentation based on a received time determined by a media device and a time in flight for transmitting data between the sensor device and the media device. For example, process 700 can be performed by media systems 400, as described above. Process 700 can be performed to determine the propagation latency for each playback channel (e.g., including playback devices) in media system 400. The propagation latency determined for each playback channel can then be used by media device 110 to adjust the transmission times of media content through each playback channel so that the media content is presented in a synchronous manner across all playback devices.

At step 702, media device 110 can cause media device 110 and sensor device 140 to enter calibration mode. For example, media module 112 can receive explicit user input indicating that the user wishes to calibrate media system 400. The user input can be received by media module 112 through a remote control (e.g., sensor device 140) associated with media device 110.

In some implementations, media module 112 can detect when the user activates a sensor (e.g., microphone, camera, etc.) on sensor device 140 and take the opportunity (e.g., without explicit user input) to calibrate media system 400. For example, the user may enable the microphone on sensor device 140 to provide voice input to media module 112. Media module 112 can receive a message from sensor device 140 indicating that the microphone is active or turned on and cause media module 112 and remote module 142 to enter calibration mode. Thus, media module 112 can cause media module 112 and remote module 142 to enter calibration mode opportunistically when the user enables a calibration sensor (e.g., microphone, camera, etc.) on sensor device 140.

In some implementations, media module 112 can periodically calibrate media system 400. For example, media module can calibrate media system 400 on a recurring, periodic basis (e.g., daily, weekly, etc.). If media module 112 has not recently calibrated media system 400, media module 112 can automatically enter calibration mode at the end of the configured period and send a notification to sensor device 140 to cause sensor device 140 to enter calibration mode. For example, a user of sensor device 140 can interact with the notification to allow remote module 142 to enter calibration mode and activate the calibration sensors (e.g., microphone, camera, etc.) on sensor device 140, as described above.

At step 704, media device 110 can send calibration content to a playback device through a playback channel and record the transmission time. For example, media module 112 can determine the sensor capabilities (e.g., sound sensor—microphone, image sensor—camera, etc.) of sensor device 140. Media module 112 can determine the media presentation capabilities (e.g., audio only, audio and video, etc.) of the playback devices in media system 400. Media module 112 can select calibration content to send to each playback device on each playback channel based on the determined capabilities of sensor device 140 and the playback devices. For example, when sensor device 140 can only detect sound (e.g., is configured with only a microphone), then media module 112 can send audio calibration data to the various playback devices in media system 400.

When sensor device 140 can detect sound and images, media module 112 can select audio or video calibration data according to the output capabilities of the playback devices. For example, video calibration data can be sent to playback devices having displays. Audio calibration data can be sent to playback devices having speakers. When sending calibration data to a playback device over a playback channel, media module 112 can record the local system time (e.g., using the system clock of media device 110) at which the calibration data was sent over the playback channel. When the playback device receives the calibration data 118, the playback device can present the calibration data 118 using a display or speakers of the playback device.

At step 706, sensor device 140 can detect calibration content presented by a playback device and record the detection time. For example, when in calibration mode, the calibration sensor(s) of sensor device 140 may remain enabled (e.g., active, turned on) such that sounds and/or images corresponding to the calibration content presented by playback devices can be detected by sensor device 140. Remote module 142 can sample (e.g., periodically record) the sounds and/or images detected by sensor device 140 when in calibration mode. In the example of media system 400, remote module 142 will not record the time at which each sample is recorded and/or calibration data is generated because remote module 142 does not have access to a clock on sensor device 140.

At step 708, sensor device 140 can send calibration data to media device 110. For example, remote module 142 can send the calibration data for the current sampling period to media device 140.

In some implementations, steps 706 and 708 can be performed repeatedly while in calibration mode. For example, remote module 142 can sample the data generated by the calibration sensors (e.g., microphone, camera, etc.) on sensor device 140 on a periodic basis (e.g., every 50 milliseconds, every one second, etc.), store the sensor data (e.g., detected calibration data), record the current time for the current sample, and send the current sample and the current time to media device 110 for analysis. Remote module 142 may iterate through many sampling periods while in calibration mode. Thus, remote module 142 may send many instances of calibration data to media module 112 on media device 110.

At step 710, media device 110 can determine a time when media device receives the calibration data from sensor device 140. For example, when media device 110 receives calibration data, media module 112 can obtain the current system time from the system clock on media device 110 and store the current system time as the received time for the calibration data.

At step 712, media device 110 can calculate the propagation latency based on the transmission time, calibration data, the received time of the calibration data, and the time in flight of transmission between sensor device 140 and media device 110. For example, media module 112 can analyze each instance of calibration data to determine which instance, or instances when multiple playback channels are calibrated, of calibration data include a calibration segment (e.g., the audio and/or video calibration pattern). When media module 112 identifies an instance of calibration data that includes the calibration segment, media module 112 can determine the time at which the calibration segment of the calibration data (e.g., sampled sensor data) was presented by a playback device and/or received by sensor device 140. For example, the time at which the calibration segment was presented can be determined by adding the sample offset to a time (e.g., sample time) when the sample in the calibration data was captured. This sample time can be estimated by subtracting a time in flight value (e.g., corresponding to an amount of time estimated for a message to travel from sensor device 140 to media device 110) from the calibration data received time determined at step 710. Media module 112 can then determine the time (e.g., presentation time) at which the calibration content was presented by the playback device based on the calibration offset of the calibration segment (e.g., subtract the calibration offset from the time at which the calibration segment was presented), as described above. Media module 112 can then calculate the propagation latency based on the difference between the transmission time of the calibration content and the presentation time of the calibration segment. For example, media module 112 can subtract the transmission time recorded when calibration content 118 was sent to the playback device through the playback channel from the presentation time determined based on the calibration data.

At step 714, media device 110 can adjust the transmission delay for the playback channel when sending media content for playback based on the playback latency determined for the playback channel. For example, media module 112 can compare the presentation latency for the playback channel to the presentation latencies calculated for other playback channels and adjust the playback delays (e.g., an amount of time for delaying sending the media content) for each playback channel to accommodate the playback channel that has the longest presentation latency. For example, if playback channel 126 has a presentation latency of 5 seconds and playback channel 162 has a playback latency of 2 seconds, then media module 112 can delay sending media content on playback channel 162 for 3 seconds after sending the same media content on playback channel 126 so that the media content will be presented simultaneously by the playback devices associated with each playback channel.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of personal information data, in the present technology, can be used to the benefit of users. For example, the personal information data (e.g., samples of detected audio and/or video calibration data) can be used to calibrate playback devices so that audio and/or video data can be presented in a synchronized manner across different playback devices. Accordingly, use of such personal information data enables calculated control of the presented audio and/or video content. Although in some instances, a user's voice and/or other sounds proximate to the sensor device may be recorded while sampling audio and/or video calibration data, the systems described herein maintain and protect the user's privacy by recording and/or detecting the audio/video data only in response to user input indicating that such audio and/or video detection sensors (e.g., camera, microphone, etc.) should be activated, enabled, or turned on. Thus, outside of the specific calibration processes described herein, the technology described herein is not configured to record audio and/or video data without the user's knowledge and/or consent.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 8:
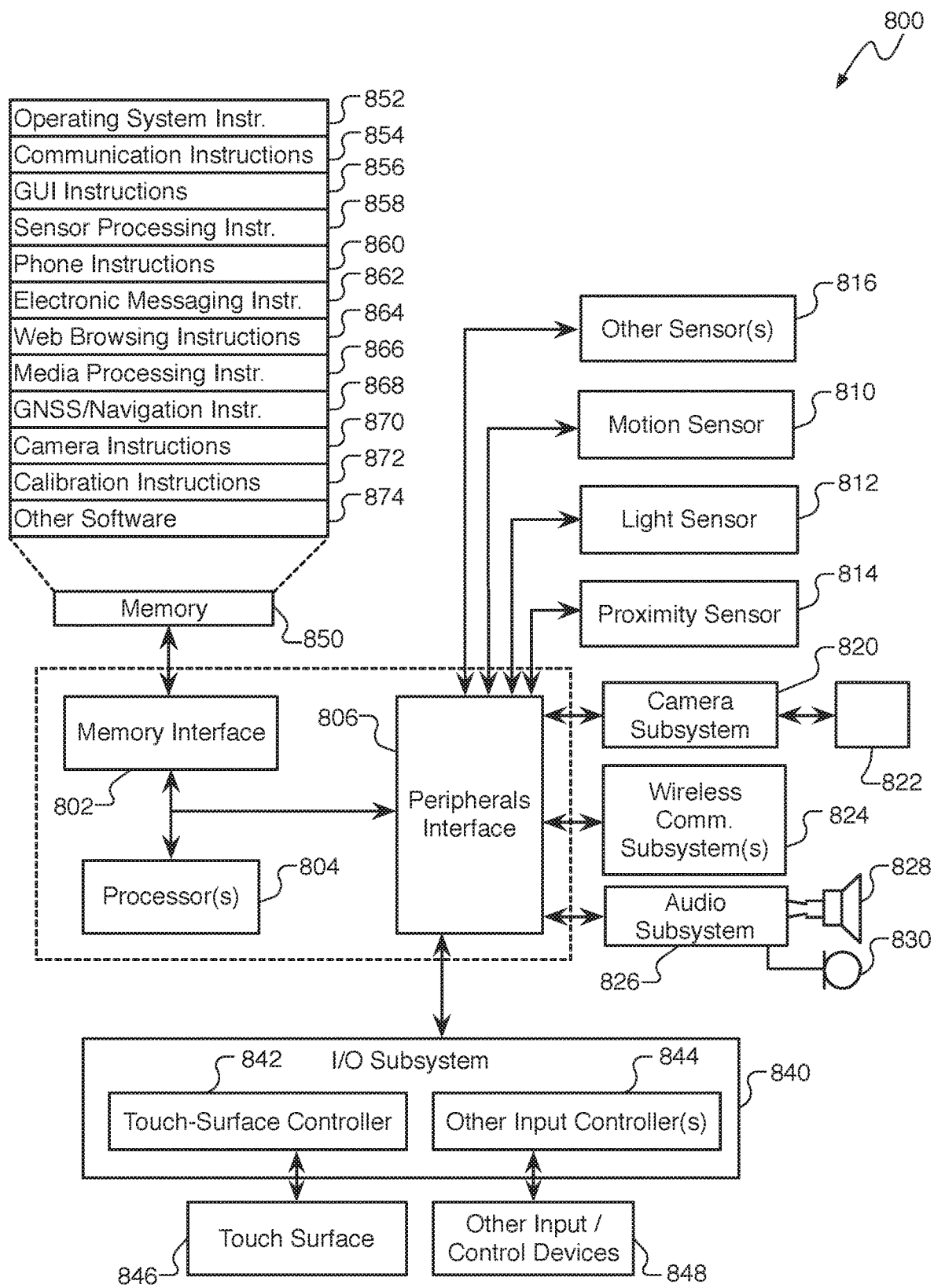
FIG. 8 is a block diagram of an example computing device that can implement the features and processes of FIGS. 1-7.

FIG. 8 is a block diagram of an example computing device 800 that can implement the features and processes of FIGS. 1-7. The computing device 800 can include a memory interface 802, one or more data processors, image processors and/or central processing units 804, and a peripherals interface 806. The memory interface 802, the one or more processors 804 and/or the peripherals interface 806 can be separate components or can be integrated in one or more integrated circuits. The various components in the computing device 800 can be coupled by one or more communication buses or signal lines.

Sensors, devices, and subsystems can be coupled to the peripherals interface 806 to facilitate multiple functionalities. For example, a motion sensor 810, a light sensor 812, and a proximity sensor 814 can be coupled to the peripherals interface 806 to facilitate orientation, lighting, and proximity functions. Other sensors 816 can also be connected to the peripherals interface 806, such as a global navigation satellite system (GNSS) (e.g., GPS receiver), a temperature sensor, a biometric sensor, magnetometer or other sensing device, to facilitate related functionalities.

A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips. The camera subsystem 820 and the optical sensor 822 can be used to collect images of a user to be used during authentication of a user, e.g., by performing facial recognition analysis.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which the computing device 800 is intended to operate. For example, the computing device 800 can include communication subsystems 824 designed to operate over a GSM network, a GPRS network, an EDGE network, a Wi-Fi or WiMax network, and a Bluetooth™ network. In particular, the wireless communication subsystems 824 can include hosting protocols such that the device 100 can be configured as a base station for other wireless devices.

An audio subsystem 826 can be coupled to a speaker 828 and a microphone 830 to facilitate voice-enabled functions, such as speaker recognition, voice replication, digital recording, and telephony functions. The audio subsystem 826 can be configured to facilitate processing voice commands, voiceprinting and voice authentication, for example.

The I/O subsystem 840 can include a touch-surface controller 842 and/or other input controller(s) 844. The touch-surface controller 842 can be coupled to a touch surface 846. The touch surface 846 and touch-surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of the speaker 828 and/or the microphone 830.

In one implementation, a pressing of the button for a first duration can disengage a lock of the touch surface 846; and a pressing of the button for a second duration that is longer than the first duration can turn power to the computing device 800 on or off. Pressing the button for a third duration can activate a voice control, or voice command, module that enables the user to speak commands into the microphone 830 to cause the device to execute the spoken command. The user can customize a functionality of one or more of the buttons. The touch surface 846 can, for example, also be used to implement virtual or soft buttons and/or a keyboard.

In some implementations, the computing device 800 can present recorded audio and/or video files, such as MP3, AAC, and MPEG files. In some implementations, the computing device 800 can include the functionality of an MP3 player, such as an iPod™.

The memory interface 802 can be coupled to memory 850. The memory 850 can include high-speed random-access memory and/or non-volatile memory, such as one or more magnetic disk storage devices, one or more optical storage devices, and/or flash memory (e.g., NAND, NOR). The memory 850 can store an operating system 852, such as Darwin, RTXC, LINUX, UNIX, OS X, WINDOWS, or an embedded operating system such as VxWorks.

The operating system 852 can include instructions for handling basic system services and for performing hardware dependent tasks. In some implementations, the operating system 852 can be a kernel (e.g., UNIX kernel). In some implementations, the operating system 852 can include instructions for performing voice authentication. For example, operating system 852 can implement the media system calibration features as described with reference to FIGS. 1-7.

The memory 850 can also store communication instructions 854 to facilitate communicating with one or more additional devices, one or more computers and/or one or more servers. The memory 850 can include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GNSS/Navigation instructions 868 to facilitate GNSS and navigation-related processes and instructions; and/or camera instructions 870 to facilitate camera-related processes and functions.

The memory 850 can store other software instructions 872 to facilitate other processes and functions, such as the media system calibration processes and functions as described with reference to FIGS. 1-7.

The memory 850 can also store other software instructions 874, such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions of the computing device 800 can be implemented in hardware and/or in software, including in one or more signal processing and/or application specific integrated circuits.

Example Embodiments

Some embodiments can include a method comprising: detecting, by a sensor device, a portion of calibration content presented by a first playback device, the portion of calibration content transmitted to the first playback device from a media device at a transmission time determined based on a first clock at the media device; generating, by the sensor device, calibration data, the calibration data including the portion of the detected calibration content and a detection time indicating when the portion of the calibration content was detected by the sensor device, the detection time determined based on a second clock on the sensor device; sending, by the sensor device, the calibration data to the media device, wherein the media device calculates a propagation latency value based on a transmission time, the portion of the detected calibration content, and the detection time indicated in the calibration data.

The method can include embodiments wherein the first clock is a system clock and the second clock is a Bluetooth clock. The method can include embodiments wherein the first clock and the second clock are system clocks of the media device and the sensor device respectively. The method can include embodiments wherein the calibration content includes a first media segment followed by a calibration media segment followed by a second media segment. The method can include embodiments wherein the calibration content is audio content. The method can include embodiments wherein the calibration content is video content. The method can include embodiments wherein the sensor device is a remote-control device for remotely controlling the media device.

Some embodiments can include a system comprising: a plurality of computing devices, including a media device, a sensor device; and a plurality of non-transitory computer-readable medium including one or more sequences of instructions that, when executed by the computing devices, cause the computing devices to perform operations comprising: sending, by the media device, calibration content to a first playback device associated with a first playback channel; storing, by the media device, a transmission time indicating when the calibration content was sent to the first playback device, the transmission time determined based on a first clock on the media device; detecting, by the sensor device, a portion of calibration content presented by the first playback device; generating, by the sensor device, calibration data, the calibration data including the portion of the detected calibration content and a detection time indicating when the portion of the calibration content was detected, the detection time determined based on a second clock on the sensor device; sending, by the sensor device, the calibration data to the media device; and calculating, by the media device, a propagation latency value based on the transmission time, the portion of the detected calibration content, and the detection time indicated in the calibration data.

The system can include embodiments wherein the first clock is a system clock and the second clock is a Bluetooth clock. The system can include embodiments wherein the first clock and the second clock are system clocks of the media device and the sensor device respectively. The system can include embodiments wherein the calibration content includes a first media segment followed by a calibration media segment followed by a second media segment. The system can include embodiments wherein the calibration content is audio content. The system can include embodiments wherein the calibration content is video content. The system can include embodiments wherein the calibration media segment is associated with a time offset, and wherein the instructions cause the computing devices to perform operations comprising: calculating, by the media device, a propagation latency value based on the transmission time, the detection time, and the time offset for the calibration media segment.

Some embodiments can include a media device comprising: one or more processors; and a non-transitory computer readable medium including one or more sequences of instructions that, when executed by the one or more processors, cause the processors to perform operations comprising: sending, by the media device, calibration content to a first playback device associated with a first playback channel; storing, by the media device, a transmission time indicating when the calibration content was sent to the first playback device, the transmission time determined based on a first clock on the media device; receiving, by the media device from a sensor device, the calibration data, the calibration data including a portion of calibration content presented by the first playback device and detected by the sensor device; determining, by the media device, a received time indicating when the calibration data was received by the media device, the received time determined based on the first clock on the media device; and calculating, by the media device, a propagation latency value based on the transmission time, the received time, the portion of the detected calibration content, and a time in flight value representing an amount of time it takes for a message to be received at the media device after being sent by the sensor device.

The media device can include embodiments wherein the calibration content includes a first media segment followed by a calibration media segment followed by a second media segment. The media device can include embodiments wherein the calibration content is audio content. The media device can include embodiments wherein the calibration content is video content. The media device can include embodiments wherein the instructions cause operations comprising: determining a detection time for the portion of calibration content based on the received time and the time in flight value. The media device can include embodiments wherein the calibration media segment is associated with a time offset, and wherein the instructions cause operations comprising: calculating, by the media device, a propagation latency value based on the transmission time, the detection time, and the time offset for the calibration media segment.

What is claimed is:

1. A method comprising:
  sending, by a media device, calibration content to a first playback device associated with a first playback channel;
  storing, by the media device, a transmission time indicating when the calibration content was sent to the first playback device, the transmission time determined based on a first clock on the media device;

detecting, by a sensor device, a portion of calibration content presented by the first playback device;

generating, by the sensor device, calibration data, the calibration data including the portion of the detected calibration content and a detection time indicating when the portion of the calibration content was detected, the detection time determined based on a second clock on the sensor device;

sending, by the sensor device, the calibration data to the media device; and calculating, by the media device, a propagation latency value based on the transmission time, the portion of the detected calibration content, and the detection time indicated in the calibration data.

2. The method of claim 1, wherein the first clock is a system clock and the second clock is a Bluetooth clock.

3. The method of claim 1, wherein the first clock and the second clock are system clocks of the media device and the sensor device respectively.

4. The method of claim 1, wherein the calibration content includes a first media segment followed by a calibration media segment followed by a second media segment.

5. The method of claim 4, wherein the calibration media segment is associated with a time offset, and further comprising:

calculating, by the media device, a propagation latency value based on the transmission time, the detection time, and the time offset for the calibration media segment.

6. The method of claim 1, wherein the calibration content is audio content.

7. The method of claim 1, wherein the calibration content is video content.

8. A method comprising:

sending, by a media device, calibration content to a first playback device associated with a first playback channel;

storing, by the media device, a transmission time indicating when the calibration content was sent to the first playback device, the transmission time determined based on a first clock on the media device;

receiving, by the media device from a sensor device, calibration data, the calibration data including a portion of calibration content presented by the first playback device and detected by the sensor device;

determining, by the media device, a received time indicating when the calibration data was received by the media device, the received time determined based on the first clock on the media device; and calculating, by the media device, a propagation latency value based on the transmission time, the received time, the portion of the detected calibration content, and a time in flight value representing an amount of time it takes for a message to be received at the media device after being sent by the sensor device.

9. The method of claim 8, wherein the calibration content includes a first media segment followed by a calibration media segment followed by a second media segment.

10. The method of claim 9, wherein the calibration media segment is associated with a time offset, and further comprising:

calculating, by the media device, a propagation latency value based on the transmission time, the detection time, and the time offset for the calibration media segment.

11. The method of claim 8, wherein the calibration content is audio content.

12. The method of claim 8, wherein the calibration content is video content.

13. The method of claim 8, further comprising:

determining a detection time for the portion of calibration content based on the received time and the time in flight value.

14. A sensor device comprising:

one or more processors; and a non-transitory computer readable medium including one or more sequences of instructions that, when executed by the processors, cause the processors to perform operations comprising:

detecting, by the sensor device, a portion of calibration content presented by a first playback device, the portion of calibration content transmitted to the first playback device from a media device at a transmission time determined based on a first clock at the media device;

generating, by the sensor device, calibration data, the calibration data including the portion of the detected calibration content and a detection time indicating when the portion of the calibration content was detected by the sensor device, the detection time determined based on a second clock on the sensor device;

sending, by the sensor device, the calibration data to the media device, wherein the media device calculates a propagation latency value based on a transmission time, the portion of the detected calibration content, and the detection time indicated in the calibration data.

15. The sensor device of claim 14, wherein the first clock is a system clock and the second clock is a Bluetooth clock.

16. The sensor device of claim 14, wherein the first clock and the second clock are system clocks of the media device and the sensor device respectively.

17. The sensor device of claim 14, wherein the calibration content includes a first media segment followed by a calibration media segment followed by a second media segment.

18. The sensor device of claim 17, wherein the sensor device is a remote-control device for remotely controlling the media device.

19. The sensor device of claim 14, wherein the calibration content is audio content.

20. The sensor device of claim 14, wherein the calibration content is video content.

* * * * *